US012612130B2

(12) United States Patent　　　　　(10) Patent No.: US 12,612,130 B2
Matsushita et al.　　　　　　　　　　(45) Date of Patent: Apr. 28, 2026

(54) POWER-SUPPLYING SYSTEM OF HUMAN-POWERED VEHICLE

(71) Applicant: SHIMANO INC., Sakai City (JP)

(72) Inventors: Nanami Matsushita, Sakai City (JP); Kei Asao, Sakai City (JP); Kenji Nakano, Sakai City (JP); Susumu Endo, Sakai City (JP)

(73) Assignee: SHIMANO INC., Sakai (JP)

( * ) Notice: Subject to any disclaimer, the term of this patent is extended or adjusted under 35 U.S.C. 154(b) by 560 days.

(21) Appl. No.: 18/297,013

(22) Filed: Apr. 7, 2023

(65) Prior Publication Data

US 2024/0336327 A1　　Oct. 10, 2024

(51) Int. Cl.
B62M 6/85　　　　(2010.01)

(52) U.S. Cl.
CPC .................................... B62M 6/85 (2013.01)

(58) Field of Classification Search
CPC ......... B62M 6/85; B62M 6/90; B60L 2200/12
See application file for complete search history.

(56) References Cited

U.S. PATENT DOCUMENTS

| | | | | |
|---|---|---|---|---|
| 9,061,731 B1 * | 6/2015 | Do | ............................ | B62M 6/85 |
| 11,560,194 B2 * | 1/2023 | Griffith | ..................... | B62J 45/20 |
| 12,036,885 B2 * | 7/2024 | Woods | ................... | H02J 7/0013 |
| 12,296,921 B2 * | 5/2025 | Braedt | ...................... | B62J 43/13 |
| 2010/0170727 A1 * | 7/2010 | Hsu | .......................... | B60L 8/006 |
| | | | | 180/2.2 |
| 2020/0398923 A1 * | 12/2020 | Griffith | .................... | B62J 45/20 |
| 2022/0001955 A1 * | 1/2022 | Fujii | ........................ | H04W 4/48 |
| 2022/0131404 A1 * | 4/2022 | Nichols | ..................... | B62J 15/00 |
| 2022/0332389 A1 * | 10/2022 | Braedt | ...................... | B62J 43/28 |
| 2023/0335995 A1 * | 10/2023 | Brooker | .................. | H02J 3/322 |
| 2023/0365024 A1 * | 11/2023 | Reid | ...................... | H02J 7/0048 |
| 2024/0116383 A1 * | 4/2024 | Woods | .................... | B60L 1/006 |

FOREIGN PATENT DOCUMENTS

| | | | | | |
|---|---|---|---|---|---|
| EP | | 2913867 A1 * | 9/2015 | .............. | B60L 50/64 |
| WO | WO-2022162891 A1 * | | 8/2022 | .............. | B62M 6/45 |

* cited by examiner

*Primary Examiner* — James A Shriver, II
*Assistant Examiner* — Ian Bryce Shelton
(74) *Attorney, Agent, or Firm* — MORI & WARD, LLP

(57)　　　　　ABSTRACT

A power-supplying system of a human-powered vehicle comprises a first electric power source and electronic controller circuitry. The first electric power source is electrically connectable with a photovoltaic unit to store electricity supplied from the photovoltaic unit. The electronic controller circuitry is electrically connectable with the photovoltaic unit and a second electric power source. The electronic controller circuitry is configured to charge the second electric power source in a first state using electricity which is supplied from the photovoltaic unit without passing through the first electric power source. The electronic controller circuitry is configured to charge the first electric power source in a second state using electricity supplied from the photovoltaic unit instead of charging the second electric power source.

25 Claims, 12 Drawing Sheets

POWER-SUPPLYING SYSTEM OF HUMAN-POWERED VEHICLE

TECHNICAL FIELD

The present invention relates to a power-supplying system of a human-powered vehicle.

BACKGROUND INFORMATION

A human-powered vehicle includes an electric device powered by electricity supplied from an electric power supply. The human-powered vehicle includes a photovoltaic module to generate electricity from light energy. One of objects of the present disclosure is to efficiently utilize electricity supplied from the photovoltaic unit. Another of objects of the present disclosure is to improve stability of a power-supplying system of the human-powered vehicle.

SUMMARY

In accordance with a first aspect of the present invention, a power-supplying system of a human-powered vehicle comprises a first electric power source and electronic controller circuitry. The first electric power source is electrically connectable with a photovoltaic unit to store electricity supplied from the photovoltaic unit. The electronic controller circuitry is electrically connectable with the photovoltaic unit and a second electric power source. The electronic controller circuitry is configured to charge the second electric power source in a first state using electricity which is supplied from the photovoltaic unit without passing through the first electric power source. The electronic controller circuitry is configured to charge the first electric power source in a second state using electricity supplied from the photovoltaic unit instead of charging the second electric power source.

With the power-supplying system according to the first aspect, it is possible to separately charge the first electric power source or the second electric power source using electricity which is supplied from the photovoltaic unit depending on the situation. Thus, it is possible to efficiently utilize electricity supplied from the photovoltaic unit.

In accordance with a second aspect of the present invention, a power-supplying system of a human-powered vehicle comprises a first electric power source and electronic controller circuitry. The first electric power source is electrically connectable with a photovoltaic unit to store electricity supplied from the photovoltaic unit. The electronic controller circuitry is electrically connectable with the photovoltaic unit and a second electric power source. The electronic controller circuitry is configured to charge the second electric power source in a first state using electricity supplied from the photovoltaic unit. The electronic controller circuitry is configured to charge the first electric power source in a second state using electricity supplied from the photovoltaic unit. The electronic controller circuitry is configured to change a state of the power-supplying system between at least the first state and the second state.

With the power-supplying system according to the second aspect, it is possible to change the state of the power-supplying system depending on the situation between at least the first state and the second state. Thus, it is possible to efficiently utilize electricity supplied from the photovoltaic unit.

In accordance with a third aspect of the present invention, a power-supplying system of a human-powered vehicle comprises a first electric power source and electronic controller circuitry. The first electric power source is electrically connectable with a photovoltaic unit to store electricity supplied from the photovoltaic unit. The electronic controller circuitry is electrically connectable with the photovoltaic unit and a second electric power source to charge the second electric power source using electricity supplied from the photovoltaic unit. The electronic controller circuitry is configured to be powered by an electric power source other than the first electric power source.

With the power-supplying system according to the third aspect, it is possible to power the electronic controller circuitry regardless of a level of charge of the first electric power source. Thus, it is possible to improve stability of the power-supplying system.

In accordance with a fourth aspect of the present invention, the power-supplying system according to the third aspect is configured so that the electronic controller circuitry is configured to charge the second electric power source in a first state using electricity which is supplied from the photovoltaic unit without passing through the first electric power source. The electronic controller circuitry is configured to charge the first electric power source in a second state using electricity supplied from the photovoltaic unit instead of charging the second electric power source.

With the power-supplying system according to the fourth aspect, it is possible to separately charge the first electric power source or the second electric power source using electricity which is supplied from the photovoltaic unit depending on the situation. Thus, it is possible to efficiently utilize electricity supplied from the photovoltaic unit while improving stability of the power-supplying system.

In accordance with a fifth aspect of the present invention, the power-supplying system according to any one of the first to fourth aspects is configured so that the electronic controller circuitry is configured to charge the second electric power source in a third state using electricity supplied from the first electric power source.

With the power-supplying system according to the fifth aspect, it is possible to charge the second electric power using electricity supplied from the first electric power source, for example, in a case where a level of electricity supplied from the photovoltaic unit is low. Thus, it is possible to improve stability of the power-supplying system.

In accordance with a sixth aspect of the present invention, the power-supplying system according to any one of the first to fifth aspects further comprises a first converter. The first electric power source is configured to store electricity supplied from the photovoltaic unit at a first voltage. The first converter is electrically connectable with the photovoltaic unit to convert the first voltage to a second voltage.

With the power-supplying system according to the sixth aspect, it is possible to use the first voltage and the second voltage. Thus, it is possible to efficiently utilize electricity supplied from the photovoltaic unit.

In accordance with a seventh aspect of the present invention, the power-supplying system according to the sixth aspect is configured so that the electronic controller circuitry is configured to charge the second electric power source in the first state using electricity which is supplied from the photovoltaic unit via the first converter without passing through the first electric power source.

With the power-supplying system according to the seventh aspect, it is possible to more efficiently utilize electricity supplied from the photovoltaic unit.

In accordance with an eighth aspect of the present invention, the power-supplying system according to the sixth or seventh aspect is configured so that the electronic controller circuitry is configured to charge the first electric power source in the second state using electricity which is supplied from the photovoltaic unit without passing through the first converter instead of charging the second electric power source.

With the power-supplying system according to the eighth aspect, it is possible to more efficiently utilize electricity supplied from the photovoltaic unit.

In accordance with a ninth aspect of the present invention, the power-supplying system according to any one of the sixth to eighth aspects is configured so that the electronic controller circuitry is configured to charge the second electric power source in a third state using electricity supplied from the first electric power source via the first converter.

With the power-supplying system according to the ninth aspect, it is possible to more efficiently utilize electricity supplied from the photovoltaic unit.

In accordance with a tenth aspect of the present invention, the power-supplying system according to any one of the sixth to ninth aspects further comprises a second converter electrically connectable with the photovoltaic unit to convert an initial voltage supplied from the photovoltaic unit to the first voltage.

With the power-supplying system according to the tenth aspect, it is possible to use the initial voltage, the first voltage, and the second voltage. Thus, it is possible to more efficiently utilize electricity supplied from the photovoltaic unit.

In accordance with an eleventh aspect of the present invention, the power-supplying system according to the tenth aspect is configured so that the electronic controller circuitry is configured to charge the second electric power source in the first state using electricity which is supplied from the photovoltaic unit via the first converter and the second converter without passing through the first electric power source.

With the power-supplying system according to the eleventh aspect, it is possible to convert the initial voltage to the second voltage using the first converter and the second converter. Thus, it is possible to more efficiently utilize electricity supplied from the photovoltaic unit.

In accordance with a twelfth aspect of the present invention, the power-supplying system according to the tenth or eleventh aspect is configured so that the electronic controller circuitry is configured to charge the first electric power source in the second state using electricity which is supplied from the photovoltaic unit via the second converter without passing through the first converter instead of charging the second electric power source.

With the power-supplying system according to the twelfth aspect, it is possible to more efficiently utilize electricity supplied from the photovoltaic unit.

In accordance with a thirteenth aspect of the present invention, the power-supplying system according to any one of the tenth to twelfth aspects is configured so that the electronic controller circuitry is configured to charge the second electric power source in the third state using electricity which is supplied from the first electric power source via the first converter.

With the power-supplying system according to the thirteenth aspect, it is possible to more efficiently utilize electricity supplied from the photovoltaic unit.

In accordance with a fourteenth aspect of the present invention, the power-supplying system according to any one of the first to thirteenth aspects is configured so that the electronic controller circuitry is configured to charge the second electric power source using electricity which is supplied from the photovoltaic unit without passing through the first electric power source in the first state in a case where a level of charge of the second electric power source is lower than a second level threshold.

With the power-supplying system according to the fourteenth aspect, it is possible to efficiently charge the second electric power source using electricity supplied from the photovoltaic unit depending on the level of charge of the second electric power source. Thus, it is possible to more efficiently utilize electricity supplied from the photovoltaic unit.

In accordance with a fifteenth aspect of the present invention, the power-supplying system according to the fourteenth aspect is configured so that the electronic controller circuitry is configured to charge the second electric power source using electricity which is supplied from the photovoltaic unit without passing through the first electric power source in the first state in a case where the level of charge of the second electric power source is lower than the second level threshold and where a level of electricity supplied from the photovoltaic unit is higher than an electricity level threshold.

With the power-supplying system according to the fifteenth aspect, it is possible to efficiently charge the second electric power source using electricity supplied from the photovoltaic unit depending on the level of charge of the second electric power source and the electricity supplied from the photovoltaic unit. Thus, it is possible to more efficiently utilize electricity supplied from the photovoltaic unit.

In accordance with a sixteenth aspect of the present invention, the power-supplying system according to the fifteenth aspect is configured so that the electronic controller circuitry is configured to stop charging the second electric power source using electricity supplied from the photovoltaic unit in at least one of a case where the level of charge of the second electric power source is higher than the second level threshold and a case where the level of electricity supplied from the photovoltaic unit is lower than the electricity level threshold.

With the power-supplying system according to the sixteenth aspect, it is possible to stop charge the second electric power source depending on the level of charge of the second electric power source and the electricity supplied from the photovoltaic unit. Thus, it is possible to more efficiently utilize electricity supplied from the photovoltaic unit.

In accordance with a seventeenth aspect of the present invention, the power-supplying system according to any one of the first to sixteenth aspects is configured so that the electronic controller circuitry is configured to charge the first electric power source using electricity supplied from the photovoltaic unit instead of charging the second electric power source in the second state in a case where a level of electricity supplied from the photovoltaic unit is lower than an electricity level threshold.

With the power-supplying system according to the seventeenth aspect, it is possible to efficiently charge the first electric power source using electricity supplied from the photovoltaic unit depending on the level of electricity supplied from the photovoltaic unit. Thus, it is possible to more efficiently utilize electricity supplied from the photovoltaic unit.

In accordance with an eighteenth aspect of the present invention, the power-supplying system according to the seventeenth aspect is configured so that the electronic controller circuitry is configured to charge the first electric power source using electricity supplied from the photovoltaic unit instead of charging the second electric power source in the second state in a case where a level of charge of the first electric power source is lower than a first level threshold and where the level of electricity supplied from the photovoltaic unit is lower than the electricity level threshold.

With the power-supplying system according to the eighteenth aspect, it is possible to efficiently charge the first electric power source using electricity supplied from the photovoltaic unit depending on the level of charge of the first electric power source and the level of electricity supplied from the photovoltaic unit. Thus, it is possible to more efficiently utilize electricity supplied from the photovoltaic unit.

In accordance with a nineteenth aspect of the present invention, the power-supplying system according to the eighteenth aspect is configured so that the electronic controller circuitry is configured to stop charging the first electric power source using electricity supplied from the photovoltaic unit in at least one of a case where the level of charge of the first electric power source is higher than the first level threshold and a case where the level of electricity supplied from the photovoltaic unit is higher than the electricity level threshold.

With the power-supplying system according to the nineteenth aspect, it is possible to stop charging the first electric power source using electricity supplied from the photovoltaic unit depending on the level of charge of the first electric power source and the level of electricity supplied from the photovoltaic unit. Thus, it is possible to more efficiently utilize electricity supplied from the photovoltaic unit.

In accordance with a twentieth aspect of the present invention, the power-supplying system according to any one of the first to nineteenth aspects is configured so that the electronic controller circuitry is configured to charge the second electric power source using electricity supplied from the first electric power source in a third state in a case where a level of charge of the first electric power source is higher than a third level threshold and where a level of electricity supplied from the photovoltaic unit is lower than an electricity level threshold.

With the power-supplying system according to the twentieth aspect, it is possible to efficiently charge the second electric power source using electricity supplied from the first electric power source depending on the level of charge of the first electric power source and the level of electricity supplied from the photovoltaic unit. Thus, it is possible to more efficiently utilize electricity supplied from the photovoltaic unit.

In accordance with a twenty-first aspect of the present invention, the power-supplying system according to any one of the first to twentieth aspects is configured so that the electronic controller circuitry is configured to stop charging the second electric power source and the first electric power source in a standby state in a case where a level of charge of the second electric power source is higher than a second level threshold and where a level of charge of the first electric power source is higher than a first level threshold.

With the power-supplying system according to the twenty-first aspect, it is possible to stop charging the second electric power source and the first electric power source depending on the level of charge of the second electric power source and the first electric power source. Thus, it is possible to more efficiently utilize electricity supplied from the photovoltaic unit.

In accordance with a twenty-second aspect of the present invention, the power-supplying system according to any one of the first to twenty-first aspects is configured so that the electronic controller circuitry is configured not to be directly powered by the first electric power source.

With the power-supplying system according to the twenty-second aspect, it is possible to improve stability of the power-supplying system.

In accordance with a twenty-third aspect of the present invention, the power-supplying system according to any one of the first to twenty-second aspects further comprises the photovoltaic unit configured to convert energy of light to electricity.

With the power-supplying system according to the twenty-third aspect, it is possible to efficiently utilize electricity supplied from the photovoltaic unit.

In accordance with a twenty-fourth aspect of the present invention, the power-supplying system according to the twenty-third aspect is configured so that the photovoltaic unit includes a solar cell array electrically connected to the first electric power source and the electronic controller circuitry.

With the power-supplying system according to the twenty-fourth aspect, it is possible to utilize solar light to generate electricity.

In accordance with a twenty-fifth aspect of the present invention, the power-supplying system according to any one of the first to twenty-fourth aspects is configured so that the electronic controller circuitry is configured to be powered by the second electric power source.

With the power-supplying system according to the twenty-fifth aspect, it is possible to utilize electricity stored in the second electric power source while efficiently utilizing electricity supplied from the photovoltaic unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
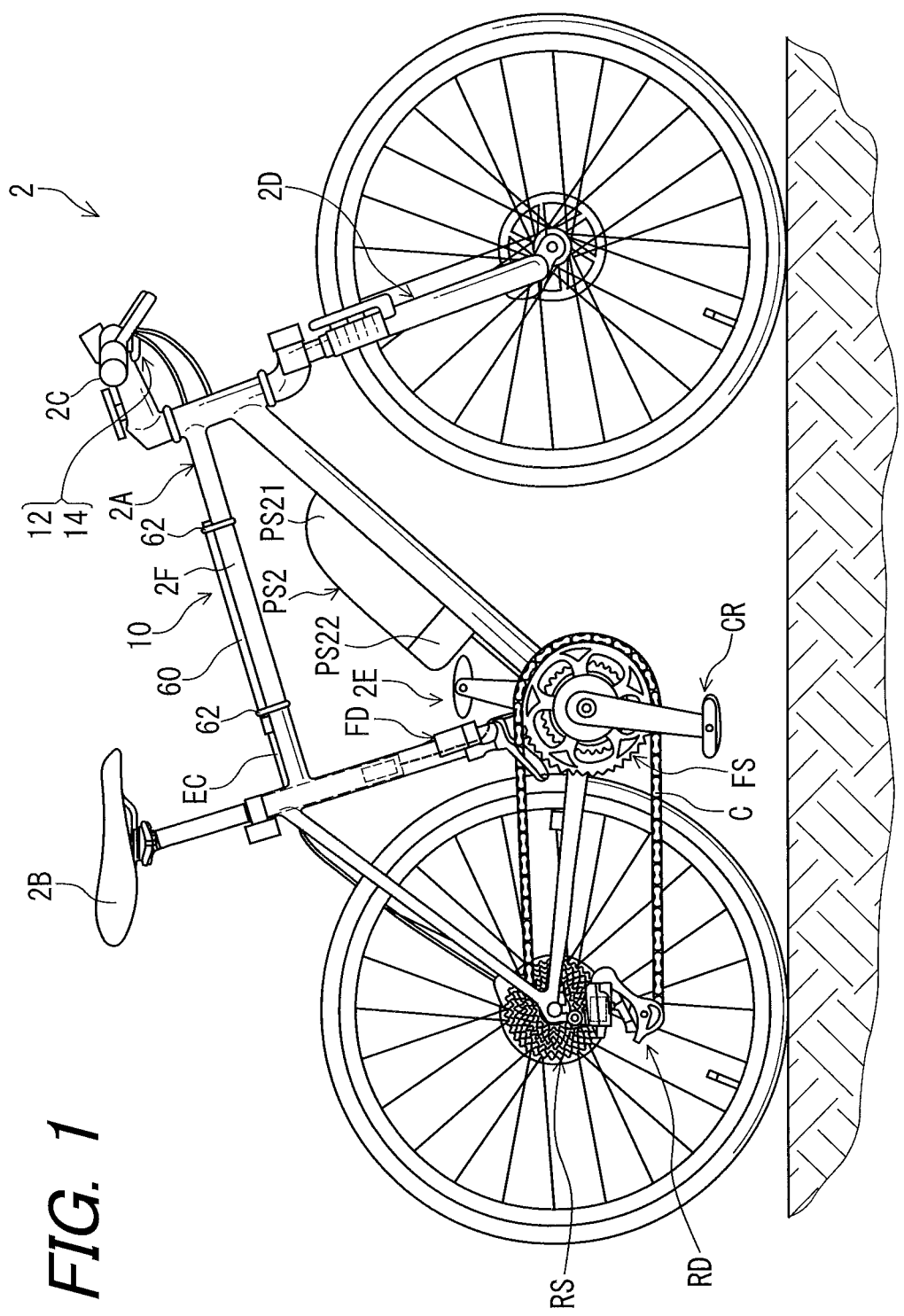
FIG. 1 is a side elevational view of a human-powered vehicle including a power-supplying system in accordance with one of embodiments.

The embodiments will now be described with reference to the accompanying drawings, wherein like reference numerals designate corresponding or identical elements throughout the various drawings.

As seen in FIG. 1, a human-powered vehicle 2 includes a power-supplying system 10 in accordance with one of embodiments. The human-powered vehicle 2 includes a vehicle body 2A, a seat 2B, a handlebar 2C, a front fork 2D, and a drive train 2E. The front fork 2D is rotatably coupled to the vehicle body 2A. The handlebar 2C is secured to the front fork 2D.

In the present application, the term "human-powered vehicle" includes a vehicle to travel with a motive power including at least a human power of a user (i.e., rider) who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source (e.g., an internal-combustion engine, an electric motor) as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the seat 2B such as a saddle) in the human-powered vehicle 2 with facing the handlebar 2C or a steering. Accordingly, these terms, as utilized to describe the power-supplying system 10 or other components, should be interpreted relative to the human-powered vehicle 2 equipped with the power-supplying system 10 or other components as used in an upright riding position on a horizontal surface.

The drive train 2E includes a crank CR, a sprocket assembly FS, a sprocket assembly RS, and a chain C. The crank CR is rotatably coupled to the vehicle body 2A. The sprocket assembly FS is coupled to the crank CR to rotate relative to the vehicle body 2A along with the crank CR. The sprocket assembly RS is rotatably coupled to the vehicle body 2A. The sprocket assembly FS includes at least two sprockets. The sprocket assembly RS includes at least two sprockets. The sprocket assemblies FS and RS define at least two gear positions. The chain C is engaged with the sprocket assembly FS and the sprocket assembly RS.

The human-powered vehicle 2 includes a first gear changer FD and a second gear changer RD. The first gear changer FD includes a front derailleur. The second gear changer RD includes a rear derailleur. The first gear changer FD is configured to perform a first gear-changer shift between the at least two first gear positions. The second gear changer RD is configured to perform a second gear-changer shift between the at least two second gear positions.

The first gear changer FD is coupled to the vehicle body 2A and is configured to shift the chain C between the at least two sprockets of the sprocket assembly RS to change a gear position. The second gear changer RD is coupled to the vehicle body 2A and is configured to shift the chain C between the at least two sprockets of the sprocket assembly FS to change a gear position.

Figure 2:
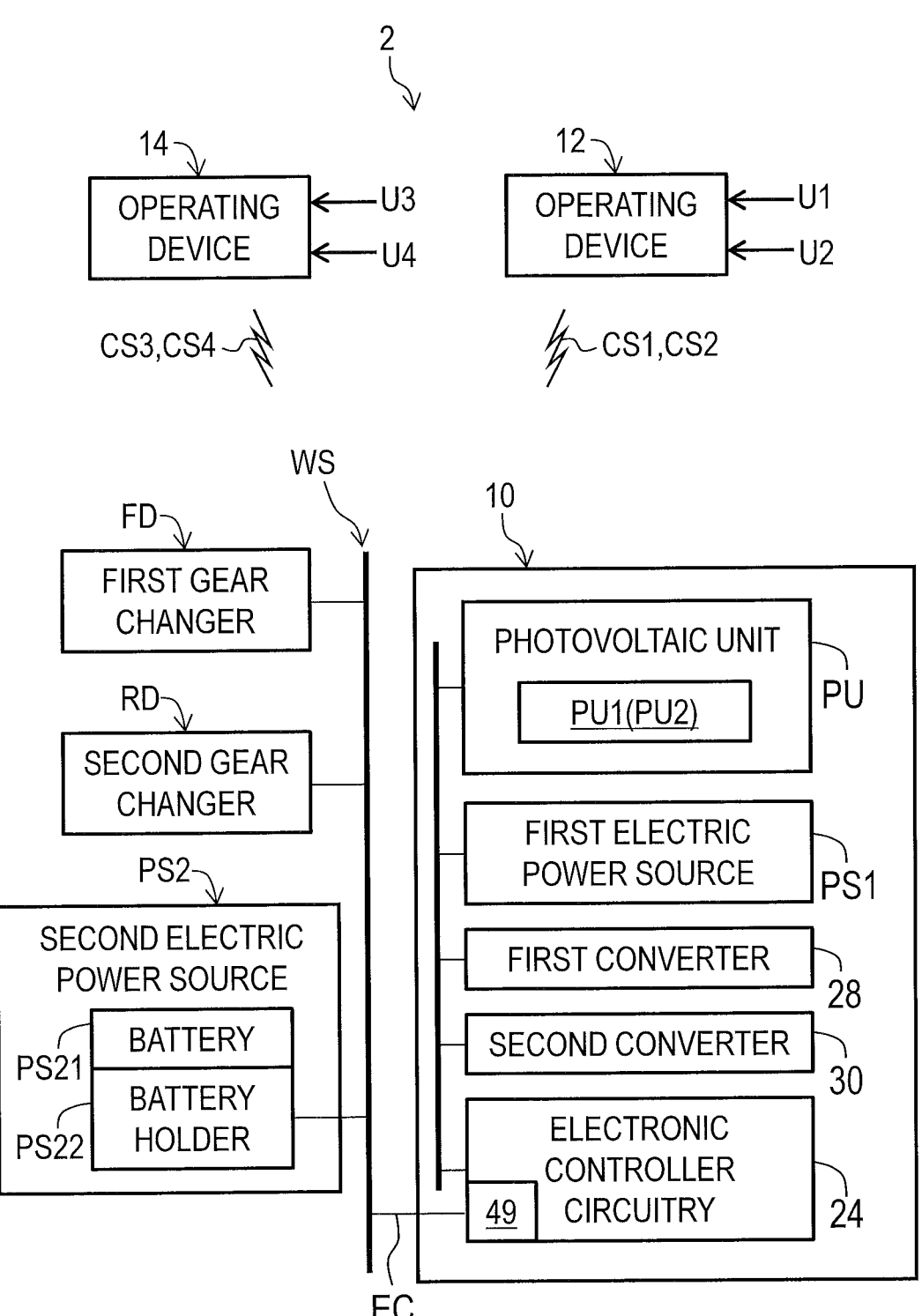
FIG. 2 is a schematic block diagram of the human-powered vehicle illustrated in FIG. 1.

As seen in FIG. 2, the human-powered vehicle 2 includes an operating device 12. The operating device 12 is mountable to the handlebar 2C (see e.g., FIG. 1). The operating device 12 is configured to receive a user input U1 to operate at least one of the first gear changer FD and the second gear changer RD. The operating device 12 is configured to receive a user input U2 to operate at least one of the first gear changer FD and the second gear changer RD. The operating device 12 is configured to transmit a control signal CS1 in response to the user input U1. The operating device 12 is configured to transmit a control signal CS2 in response to the user input U2.

The human-powered vehicle 2 includes an operating device 14. The operating device 14 is mountable to the handlebar 2C (see e.g., FIG. 1). The operating device 14 is configured to receive a user input U3 to operate at least one of the first gear changer FD and the second gear changer RD. The operating device 14 is configured to receive a user input U4 to operate at least one of the first gear changer FD and the second gear changer RD. The operating device 12 is configured to transmit a control signal CS3 in response to the user input U3. The operating device 12 is configured to transmit a control signal CS4 in response to the user input U4.

For example, the control signal CS1 indicates upshifting of the first gear changer FD. The control signal CS2 indicates downshifting of the first gear changer FD. The control signal CS3 indicates upshifting of the second gear changer RD. The control signal CS4 indicates downshifting of the second gear changer RD. However, at least one of the control signals CS1, CS2, CS3, and CS4 can indicate other actions. One of the control signal CS1 and CS2 can be omitted from the operating device 12. One of the control signal CS3 and CS4 can be omitted from the operating device 14. For example, the control signal CS1 can indicate upshifting of the electric component RD, the control signal CS3 can indicate downshifting of the electric component RD, and a concurrent input of both the control signals CS1 and CS3 can indicate one of upshifting and downshifting of the electric component FD.

In the present embodiment, the operating device 12 is configured to wirelessly transmit each of the control signals CS1 and CS2 to at least one of the first gear changer FD and the second gear changer RD. The operating device 14 is configured to wirelessly transmit each of the control signals CS3 and CS4 at least one of the first gear changer FD and the second gear changer RD. However, the operating device 12 can be configured to transmit at least one of the control signals CS1 and CS2 to at least one of the first gear changer FD and the second gear changer RD via at least one electrical cable if needed and/or desired. The operating device 12 can be configured to transmit the control signals CS3 and CS4 to at least one of the first gear changer FD and the second gear changer RD via at least one electrical cable if needed and/or desired.

In the present embodiment, the operating devices 12 and 14 are separate devices from each other. The operating device 12 is a left-hand operating device. The operating device 14 is a right-hand operating device. However, at least part of one of the operating devices 12 and 14 can be integrally provided with the other of the operating devices 12 and 14 if needed and/or desired.

As seen in FIG. 2, the human-powered vehicle 2 comprises an electric power source PS2. The electric power source PS2 is configured to supply electricity to the first gear changer FD and the second gear changer RD. The electric power source PS2 includes a battery PS21 and a battery holder PS22. The battery holder PS22 is coupled to the vehicle body 2A. The battery holder PS22 is configured to detachably and reattachably hold the battery PS21. Examples of the battery PS21 include a primary battery and a secondary battery. The electric power source PS2 can be at least partially provided in the vehicle body 2A if needed and/or desired. The electric power source PS2 can also be referred to as a second electric power source PS2.

The term "detachably and reattachably," as used herein, encompasses a configuration in which an element is repeatedly detachable from and attachable to another element without substantial damage.

As seen in FIG. 2, the human-powered vehicle 2 includes a wired communication structure WS. The electric power source PS2 is electrically connected to the first gear changer FD and the second gear changer RD via the wired communication structure WS to supply electricity to the first gear changer FD and the second gear changer RD. For example, the wired communication structure WS includes at least one electrical cable.

The battery holder PS22 is configured to be electrically connected to the first gear changer FD and the second gear changer RD via the wired communication structure WS. The battery PS21 is configured to supply electricity to the first gear changer FD and the second gear changer RD via the battery holder PS22 and the wired communication structure WS.

In the present embodiment, at least one of the power-supplying system 10, the electric power source PS2, the first gear changer FD, and the second gear changer RD is configured to communicate with another of the power-supplying system 10, the electric power source PS2, the first gear changer FD, and the second gear changer RD through a voltage line using power line communication (PLC) technology. The PLC is used for communicating between electric devices. The PLC carries data on a conductor that is also used simultaneously for electric power transmission or electric power distribution to electrical components. In the present embodiment, electricity is supplied from the electric power source PS2 to the power-supplying system 10, the first gear changer FD, and the second gear changer RD through the wired communication structure WS. Furthermore, at least one of the power-supplying system 10, the electric power source PS2, the first gear changer FD, and the second gear changer RD is configured to receive information signals from another of the power-supplying system 10, the electric power source PS2, the first gear changer FD, and the second gear changer RD through the wired communication structure WS using the PLC.

The PLC uses unique identifying information such as a unique identifier that is assigned to each of electrical components. Each of the power-supplying system 10, the electric power source PS2, the first gear changer FD, and the second gear changer RD is configured to store the unique identifying information. Based on the unique identifying information, the power-supplying system 10, the electric power source PS2, the first gear changer FD, and the second gear changer RD can recognize, based on the unique identifying information, information signals which are necessary for itself among information signals transmitted via the wired communication structure WS. For example, the power-supplying system 10, the electric power source PS2, the first gear changer FD, and the second gear changer RD can recognize information signals transmitted from the power-supplying system 10, the electric power source PS2, the first gear changer FD, and the second gear changer RD through the wired communication structure WS. Instead of using the PLC technology, however, separate signal wires can be provided for transmitting data in addition to the ground wire and the voltage wire if needed and/or desired. At least one of the power-supplying system 10, the electric power source PS2, the first gear changer FD, and the second gear changer RD can be configured to wirelessly communicate with another of the power-supplying system 10, the electric power source PS2, the first gear changer FD, and the second gear changer RD if needed and/or desired.

As seen in FIG. 2, the power-supplying system 10 of the human-powered vehicle 2 comprises a first electric power source PS1. The power-supplying system 10 comprises a photovoltaic device 20. The photovoltaic device 20 of the human-powered vehicle 2 comprises a photovoltaic unit PU. Namely, the power-supplying system 10 further comprises the photovoltaic unit PU. The photovoltaic device 20 of the human-powered vehicle 2 comprises electronic controller circuitry 24. Namely, the power-supplying system 10 of the human-powered vehicle 2 comprises the electronic controller circuitry 24.

In the present embodiment, the first electric power source PS1 includes a capacitor. However, the first electric power source PS1 can include any electric power source other than the capacitor if needed and/or desired.

The photovoltaic unit PU is configured to convert energy of light to electricity. The photovoltaic unit PU includes a solar cell array PU1. The solar cell array PU1 is electrically connected to the first electric power source PS1 and the electronic controller circuitry 24. In the present embodiment, the photovoltaic unit PU includes an organic photovoltaic unit PU2. The organic photovoltaic unit PU2 includes an organic solar cell array. Namely, the photovoltaic device 20 of the human-powered vehicle 2 comprises the organic photovoltaic unit PU2. However, the photovoltaic device 20 can include a photovoltaic unit other than the organic photovoltaic unit PU2 if needed and/or desired.

The first electric power source PS1 is electrically connectable with the photovoltaic unit PU to store electricity supplied from the photovoltaic unit PU. The electronic controller circuitry 24 is electrically connectable with the photovoltaic unit PU and the second electric power source PS2. The electronic controller circuitry 24 is electrically connectable with the photovoltaic unit PU and the second electric power source PS2 to charge the second electric power source PS2 using electricity supplied from the photovoltaic unit PU.

Figure 3:
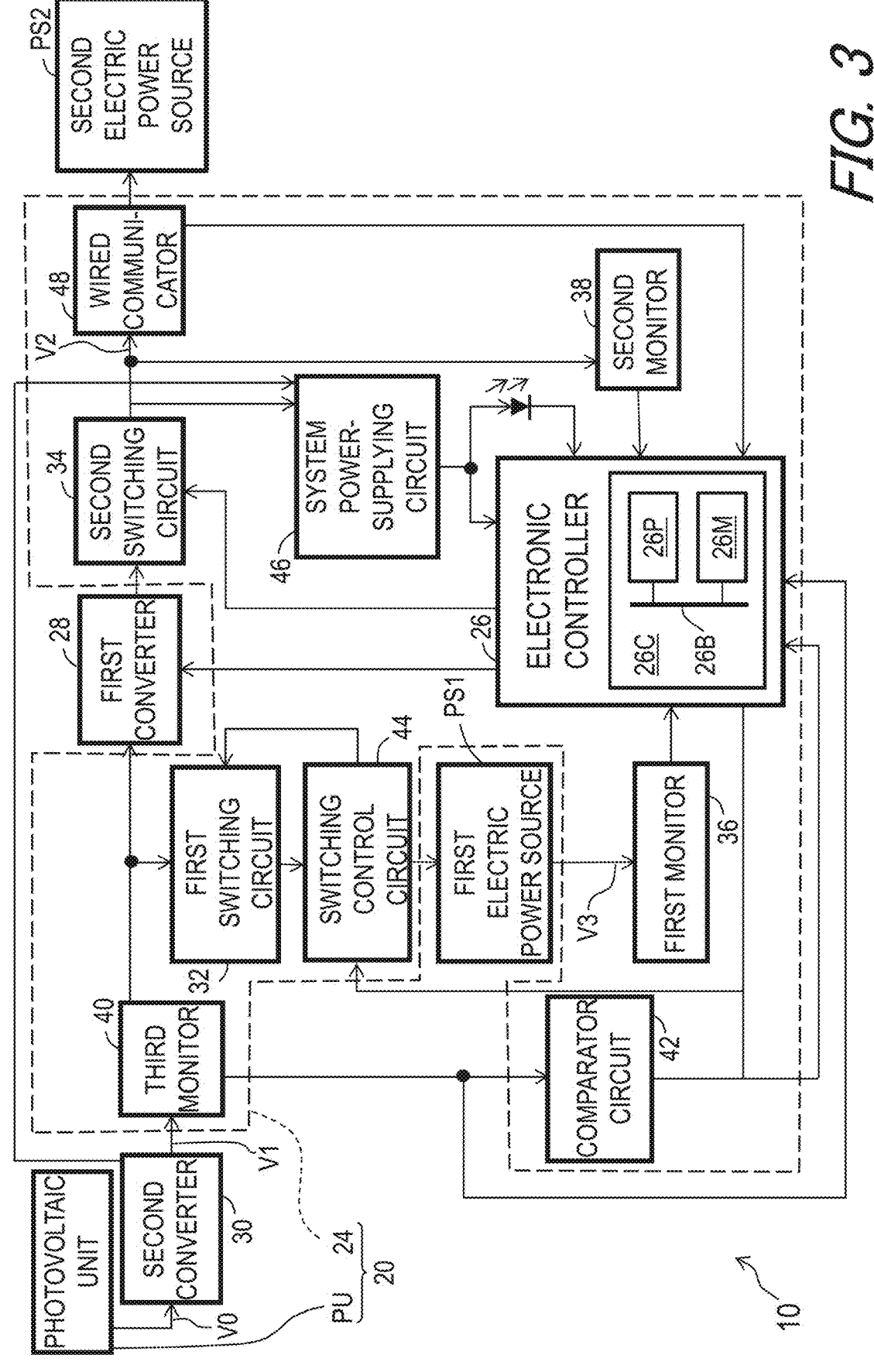
FIG. 3 is a schematic block diagram of the power-supplying system of the human-powered vehicle illustrated in FIG. 1.

As seen in FIG. 3, the electronic controller circuitry 24 is electrically connected to the photovoltaic unit PU. The electronic controller circuitry 24 is electrically connected to the organic photovoltaic unit PU2. The electronic controller circuitry 24 includes a power-supplying controller 26.

The power-supplying controller 26 includes a hardware processor 26P, a hardware memory 26M, a circuit board 26C, and a system bus 26B. Namely, the electronic controller circuitry 24 includes the circuit board 26C. The hardware processor 26P is coupled to the hardware memory 26M. The hardware memory 26M is coupled to the hardware processor 26P. The hardware processor 26P and the hardware memory 26M are electrically mounted on the circuit board 26C. The hardware processor 26P is electrically connected to the hardware memory 26M via the circuit board 26C and the system bus 26B. The hardware memory 26M is electrically connected to the hardware processor 26P via the circuit board 26C and the system bus 26B. The system bus 26B is provided on the circuit board 26C. For example, the power-supplying controller 26 includes a semiconductor. The hardware processor 26P includes a semiconductor. The hardware memory 26M includes a semiconductor.

For example, the hardware processor 26P includes at least one of a central processing unit (CPU), a micro processing unit (MPU), and a memory controller. The hardware memory 26M is electrically connected to the hardware processor 26P. For example, the hardware memory 26M includes at least one of a volatile memory and a non-volatile memory. Examples of the volatile memory include a ran-dom-access memory (RAM) and a dynamic random-access memory (DRAM). Examples of the non-volatile memory include a read only memory (ROM), an electrically erasable programmable ROM (EEPROM), and a hard disc drive (HDD). The hardware memory 26M includes storage areas each having an address. The hardware processor 26P is configured to control the hardware memory 26M to store data in the storage areas of the hardware memory 26M and reads data from the storage areas of the hardware memory 26M. The hardware memory 26M can also be referred to as a computer-readable storage medium 26M.

The power-supplying controller 26 is configured to execute at least one control algorithm of the power-supply-ing system 10. For example, the power-supplying controller 26 is programed to execute at least one control algorithm of the power-supplying system 10. The hardware memory 26M stores at least one program including at least one program instruction. The at least one program is read into the hardware processor 26P, and thereby the at least one control algorithm of the power-supplying system 10 is executed based on the at least one program. The power-supplying controller 26 can also be referred to as a power-supplying controller circuit or circuitry 26.

The structure of the power-supplying controller 26 is not limited to the above structure. The structure of the power-supplying controller 26 is not limited to the hardware processor 26P, the hardware memory 26M, the circuit board 26C, and the system bus 26B. The power-supplying con-troller 26 can be realized by hardware alone or a combina-tion of hardware and software. The hardware processor 26P and the hardware memory 26M can be integrated as a one chip such as an application specific integrated circuit (ASIC) or a field programmable gate array (FPGA).

The power-supplying system 10 further comprises a first converter 28. The power-supplying system 10 further com-prises a second converter 30. The second converter 30 is provided between the photovoltaic unit PU and the first converter 28. The first converter 28 and the second converter 30 are provided between the first electric power source PS1 and the second electric power source PS2 in a state where the power-supplying system 10 is electrically connected to the second electric power source PS2.

The second converter 30 is electrically connectable with the photovoltaic unit PU to convert an initial voltage V0 supplied from the photovoltaic unit PU to a first voltage V1. The first converter 28 is electrically connectable with the photovoltaic unit PU to convert the first voltage V1 to a second voltage V2. The second converter 30 is electrically connected with the photovoltaic unit PU to convert the initial voltage V0 to the first voltage V1. The first converter 28 is electrically connected with the photovoltaic unit PU to convert the first voltage V1 to the second voltage V2. The first converter 28 is electrically connected with the second converter 30 to convert the first voltage V1 to the second voltage V2.

For example, the first converter 28 includes a first boost converter. The second converter 30 includes a second boost converter. The second converter 30 is configured to boost the initial voltage V0 to the first voltage V1. The first converter 28 is configured to boost the first voltage V1 to the second voltage V2. The power-supplying controller 26 is electri-cally connected to the first converter 28 to control the first converter 28. The power-supplying controller 26 is config-ured to control the first converter 28 to convert the first voltage V1 to the second voltage V2. The power-supplying controller 26 is configured to generate a first-converter ON command to turn the first converter 28 on. The power-supplying controller 26 is configured to generate a first-converter OFF command or the first-converter ON com-mand to turn the first converter 28 on.

The second converter 30 includes a maximum power point tracking (MPPT) controller. The MPPT controller is electrically connected to the photovoltaic unit PU to maxi-mize power output of the photovoltaic unit PU. The power output of the photovoltaic unit PU is affected by factors such as the amount of sunlight falling on it, the temperature, and the load impedance. The maximum power point (MPP) of the photovoltaic unit PU is the point at which the photovol-taic unit PU can produce the maximum power output for a given set of conditions. The MPPT controller continuously tracks the MPP of the photovoltaic unit PU and adjusts the initial voltage V0 to ensure that the photovoltaic unit PU operates at the MPP. The MPPT controller measures an output voltage and an output current of the photovoltaic unit PU and uses the output voltage and the output current to calculate the power output of the photovoltaic unit PU. The MPPT controller then adjusts the input voltage to maximize the power output.

The first electric power source PS1 is configured to store electricity supplied from the photovoltaic unit PU at the first voltage V1. The second electric power is configured to be charged at the second voltage V2. For example, the elec-tronic controller circuitry 24 includes a first switching circuit 32 and a second switching circuit 34.

The first switching circuit 32 is electrically connected to the photovoltaic unit PU and the first electric power source PS1 to change a connection state between the photovoltaic unit PU and the first electronic power source. The first switching circuit 32 is provided between the photovoltaic unit PU and the first electric power source PS1. The first switching circuit 32 is configured to make an electrical connection between the photovoltaic unit PU and the first electric power source PS1 and is configured to block the electrical connection between the photovoltaic unit PU and the first electric power source PS1. In the present embodi-ment, the first switching circuit 32 is provided between the second converter 30 and the first electric power source PS1. The first switching circuit 32 is configured to make an electrical connection between the second converter 30 and the first electric power source PS1 and is configured to block the electrical connection between the second converter 30 and the first electric power source PS1.

The power-supplying controller 26 is electrically con-nected to the first switching circuit 32 to control the elec-trical connection between the photovoltaic unit PU and the first electric power source PS1. The power-supplying con-troller 26 is electrically connected to the first switching circuit 32 to control the electrical connection between the second converter 30 and the first electric power source PS1 using the first switching circuit 32.

For example, the power-supplying controller 26 is configured to generate a first ON command indicating that the first switching circuit 32 makes the electrical connection between the photovoltaic unit PU and the first electric power source PS1. The first switching circuit 32 is configured to make the electrical connection between the photovoltaic unit PU and the first electric power source PS1 in response to the first ON command. The power-supplying controller 26 is configured to generate a first OFF command indicating that the first switching circuit 32 blocks the electrical connection between the photovoltaic unit PU and the first electric power source PS1. The first switching circuit 32 is configured to block the electrical connection between the photovoltaic unit PU and the first electric power source PS1 in response to the first OFF command.

The second switching circuit 34 is electrically connected to the photovoltaic unit PU and the second electric power source PS2 to change a connection state between the photovoltaic unit PU and the second electronic power source. The second switching circuit 34 is provided between the photovoltaic unit PU and the second electric power source PS2. The second switching circuit 34 is configured to make an electrical connection between the photovoltaic unit PU and the second electric power source PS2 and is configured to block the electrical connection between the photovoltaic unit PU and the second electric power source PS2. In the present embodiment, the second switching circuit 34 is provided between the first converter 28 and the second electric power source PS2. The second switching circuit 34 is configured to make an electrical connection between the first converter 28 and the second electric power source PS2 and is configured to block the electrical connection between the first converter 28 and the second electric power source PS2.

The power-supplying controller 26 is electrically connected to the second switching circuit 34 to control the electrical connection between the photovoltaic unit PU and the second electric power source PS2. The power-supplying controller 26 is electrically connected to the second switching circuit 34 to control the electrical connection between the second converter 30 and the second electric power source PS2 using the first switching circuit 32.

For example, the power-supplying controller 26 is configured to generate a second ON command indicating that the second switching circuit 34 makes the electrical connection between the photovoltaic unit PU and the second electric power source PS2. The second switching circuit 34 is configured to make the electrical connection between the photovoltaic unit PU and the second electric power source PS2 in response to the second ON command. The power-supplying controller 26 is configured to generate a second OFF command indicating that the second switching circuit 34 blocks the electrical connection between the photovoltaic unit PU and the second electric power source PS2. The second switching circuit 34 is configured to block the electrical connection between the photovoltaic unit PU and the second electric power source PS2 in response to the second OFF command.

The electronic controller circuitry 24 includes a first monitor 36, a second monitor 38, a third monitor 40, a comparator circuit 42, and a switching control circuit 44. The first monitor 36 is provided between the first electric power source PS1 and the power-supplying controller 26. The second monitor 38 is provided between the second electric power source PS2 and the power-supplying controller 26. The third monitor 40 is provided between the first converter 28 and the second converter 30. However, each of the first monitor 36, the second monitor 38, and the third monitor 40 can be provided in a position other than the position depicted in FIG. 3.

The first monitor 36 is electrically connected to the first electric power source PS1 to monitor a state of the first electric power source PS1. The power-supplying controller 26 is electrically connected to the first monitor 36 to obtain first information indicative of the state of the first electric power source PS1. For example, the first information includes at least one of a voltage, a current, or a state-of-charge (SOC) of the first electric power source PS1. The power-supplying controller 26 is configured to receive at least one of the voltage, the current, or the SOC of the first electric power source PS1 from the first monitor 36. For example, the first monitor 36 is configured to obtain an output voltage V3 of the first electric power source PS1. The power-supplying controller 26 can be configured to calculate the SOC based on the output voltage V3 and a relationship between the SOC and the output voltage V3. Since the method to calculate the SOC has been known in a battery field, it will not be described in detail here for the sake of brevity.

The second monitor 38 is electrically connected to the second electric power source PS2 to monitor a state of the second electric power source PS2. The power-supplying controller 26 is electrically connected to the second monitor 38 to receive second information indicative of the state of the second electric power source PS2. For example, the second information includes at least one of a voltage, a current, or a SOC of the second electric power source PS2. The power-supplying controller 26 is configured to receive at least one of the voltage, the current, or the SOC of the second electric power source PS2 from the second monitor 38. For example, the second monitor 38 is configured to obtain the second voltage V2 of the second electric power source PS2. The power-supplying controller 26 can be configured to calculate the SOC based on the second voltage V2 and a relationship between the SOC and the second voltage V2. Since the method to calculate the SOC has been known in a battery field, it will not be described in detail here for the sake of brevity.

The third monitor 40 is configured to monitor power generation of the photovoltaic unit PU. The power-supplying controller 26 is electrically connected to the third monitor 40 to receive third information indicative of power generation the photovoltaic unit PU. For example, the third information includes at least one of a voltage and a current of the photovoltaic unit PU. The power-supplying controller 26 is configured to receive at least one of the voltage and the current of the photovoltaic unit PU from the third monitor 40.

The comparator circuit 42 is electrically connected to the third monitor 40 to compare the third information monitored by the third monitor 40 with a power generation threshold. The power-supplying controller 26 is electrically connected to the comparator circuit 42 to receive a comparison result from the comparator circuit 42.

For example, the comparator circuit 42 is configured to generate a third ON command indicating that the first switching circuit 32 makes the electrical connection between the photovoltaic unit PU and the first electric power source PS1. The first switching circuit 32 is configured to make the electrical connection between the photovoltaic unit PU and the first electric power source PS1 in response to the third ON command. The comparator circuit 42 is configured to generate a third OFF command indicating that the first switching circuit 32 blocks the electrical connection between the photovoltaic unit PU and the first electric power source PS1. The first switching circuit 32 is configured to block the electrical connection between the photovoltaic unit PU and the first electric power source PS1 in response to the third OFF command.

The switching control circuit 44 is electrically connected to the first switching circuit 32 to control the first switching circuit 32 based on a command transmitted from at least one of the comparator circuit 42 and the power-supplying controller 26. For example, the switching control circuit 44 is configured to control the first switching circuit 32 to make the electrical connection between the photovoltaic unit PU and the first electric power source PS1 in response to at least one of the first ON command and the third ON command. The switching control circuit 44 is configured to control the first switching circuit 32 to block the electrical connection between the photovoltaic unit PU and the first electric power source PS1 in response to at least one of the first OFF command and the third OFF command.

The electronic controller circuitry 24 includes a system power-supplying circuit 46. The system power-supplying circuit 46 is configured to supply electricity to the electric controller. For example, the system power-supplying circuit 46 is configured to reduce the second voltage V2 applied across the first converter 28 and the second electric power source PS2 to a rated voltage of the power-supplying controller 26. The system power-supplying circuit 46 is electrically connected to the power-supplying controller 26 to supply the rated voltage to the power-supplying controller 26. Namely, the electronic controller circuitry 24 is configured to be powered by an electric power source other than the first electric power source PS1. The electronic controller circuitry 24 is configured not to be directly powered by the first electric power source PS1. The electronic controller circuitry 24 is configured to be powered by the second electric power source PS2. However, the electronic controller circuitry 24 can be configured to be powered by an electric power source other than the first electric power source PS1 and the second electric power source PS2 if needed and/or desired.

The electronic controller circuitry 24 includes a wired communicator 48. The wired communicator 48 is configured to communicate with an additional electric device via the wired communication structure WS. For example, the wired communicator 48 is configured to communicate with an additional wired communicator of the additional electric device via the wired communication structure WS using the PLC technology.

The wired communicator 48 is configured to separate, from a power source voltage supplied from the second electric power source PS2, an input signal superimposed on the power source voltage. The wired communicator 48 is configured to superimpose signals on the power source voltage.

As seen in FIG. 2, the electronic controller circuitry 24 is configured to be detachably and reattachably connected with the electric power source PS2 via an electrical cable EC. The wired communication structure WS includes the electrical cable EC. The electronic controller circuitry 24 includes a connection port 49 to which the electrical cable EC is to be detachably and reattachably connected. The connection port 49 is electrically connected to the wired communicator 48. The power-supplying controller 26 is electrically connected to the wired communicator 48 to recognize connection between the connection port 49 and the electric cable of the wired communication structure WS.

In the present embodiment, electricity is supplied from the second electric power source PS2 to the power-supplying system 10, the first gear changer FD, and the second gear changer RD through the wired communication structure WS and the wired communicator 48. Furthermore, at least one of the power-supplying system 10, the second electric power source PS2, the first gear changer FD, and the second gear changer RD is configured to receive information signals from another of the power-supplying system 10, the second electric power source PS2, the first gear changer FD, and the second gear changer RD through the wired communication structure WS using the PLC.

As seen in FIG. 3, the photovoltaic device 20 of the human-powered vehicle 2 comprises an indicator 50. The indicator 50 is configured to indicate a state of at least one of the photovoltaic device 20 and the electric power source PS2 using electricity supplied from the photovoltaic unit PU. The power-supplying controller 26 is electrically connected to the indicator 50 to control the indicator 50 based on the state of at least one of the photovoltaic device 20 and the electric power source PS2.

For example, the indicator 50 includes a light emitter such as a light emitting diode (LED). The indicator 50 is configured to indicate that the photovoltaic unit PU generates electricity. The indicator 50 is configured to turn on while the photovoltaic unit PU generates electricity. The indicator 50 is configured to turn off while the photovoltaic unit PU stops to generate electricity. The indicator 50 is configured to emit light while the photovoltaic unit PU generates electricity. The indicator 50 is configured to stop to emit light while the photovoltaic unit PU stops to generate electricity.

The indicator 50 can be configured to indicate a remaining level of at least one of the first electric power source PS1 and the second electric power source PS2. The indicator 50 can be configured to turn off while the photovoltaic unit PU stops to generate electricity.

The indicator 50 can be configured to indicate the remaining level of at least one of the first electric power source PS1 and the second electric power source PS2 with difference colors of light. For example, the indicator 50 is configured to emit light with a first color in a case where the remaining level of the second electric power source PS2 is higher than a remaining level threshold. The indicator 50 is configured to emit light with a second color different from the first color in a case where the remaining level of the second electric power source PS2 is lower than or equal to the remaining level threshold.

The indicator 50 is configured to emit green light in a case where the remaining level of the second electric power source PS2 is higher than the remaining level threshold and where a level of electricity generated by the photovoltaic unit PU is higher than a predetermined threshold. The indicator 50 is configured to stop to emit green light in a case where the remaining level of the second electric power source PS2 is higher than the remaining level threshold and where the level of electricity generated by the photovoltaic unit PU is lower than or equal to the predetermined threshold.

The indicator 50 is configured to emit red light in a case where the remaining level of the second electric power source PS2 is lower than or equal to the remaining level threshold and where a level of electricity generated by the photovoltaic unit PU is higher than the predetermined threshold. The indicator 50 is configured to stop to emit red light in a case where the remaining level of the second electric power source PS2 is lower than or equal to the remaining level threshold and where the level of electricity generated by the photovoltaic unit PU is lower than or equal to the predetermined threshold.

The first converter 28, the second converter 30, the first switching circuit 32, the second switching circuit 34, the first monitor 36, the second monitor 38, the third monitor 40, the comparator circuit 42, the switching control circuit 44, the system power-supplying circuit 46, the wired communicator 48, and the indicator 50 are electrically mounted on the circuit board 26C. The connection port 49 is electrically connected to the circuit board 26C and is entirely provided outside the circuit board 26C. However, the connection port 49 can be at least partially mounted on the circuit board 26C if needed and/or desired. At least one of the first converter 28, the second converter 30, the first switching circuit 32, the second switching circuit 34, the first monitor 36, the second monitor 38, the third monitor 40, the comparator circuit 42, the switching control circuit 44, the system power-supplying circuit 46, the wired communicator 48, and the indicator 50 can be provided outside the circuit board 26C if needed and/or desired.

Figure 4:
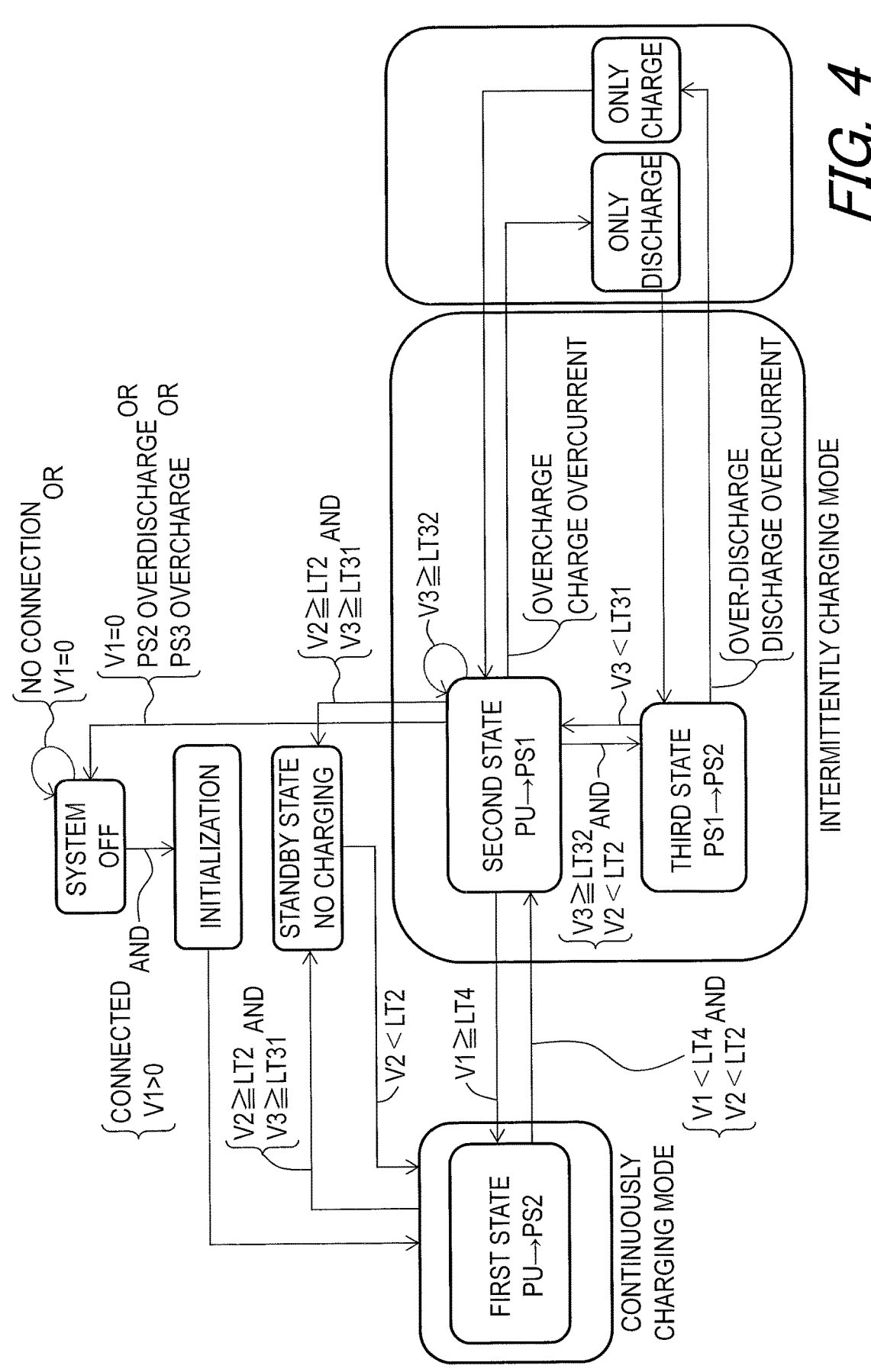
FIG. 4 is a schematic transition diagram of the power-supplying system of the human-powered vehicle illustrated in FIG. 1.
Figure 5:
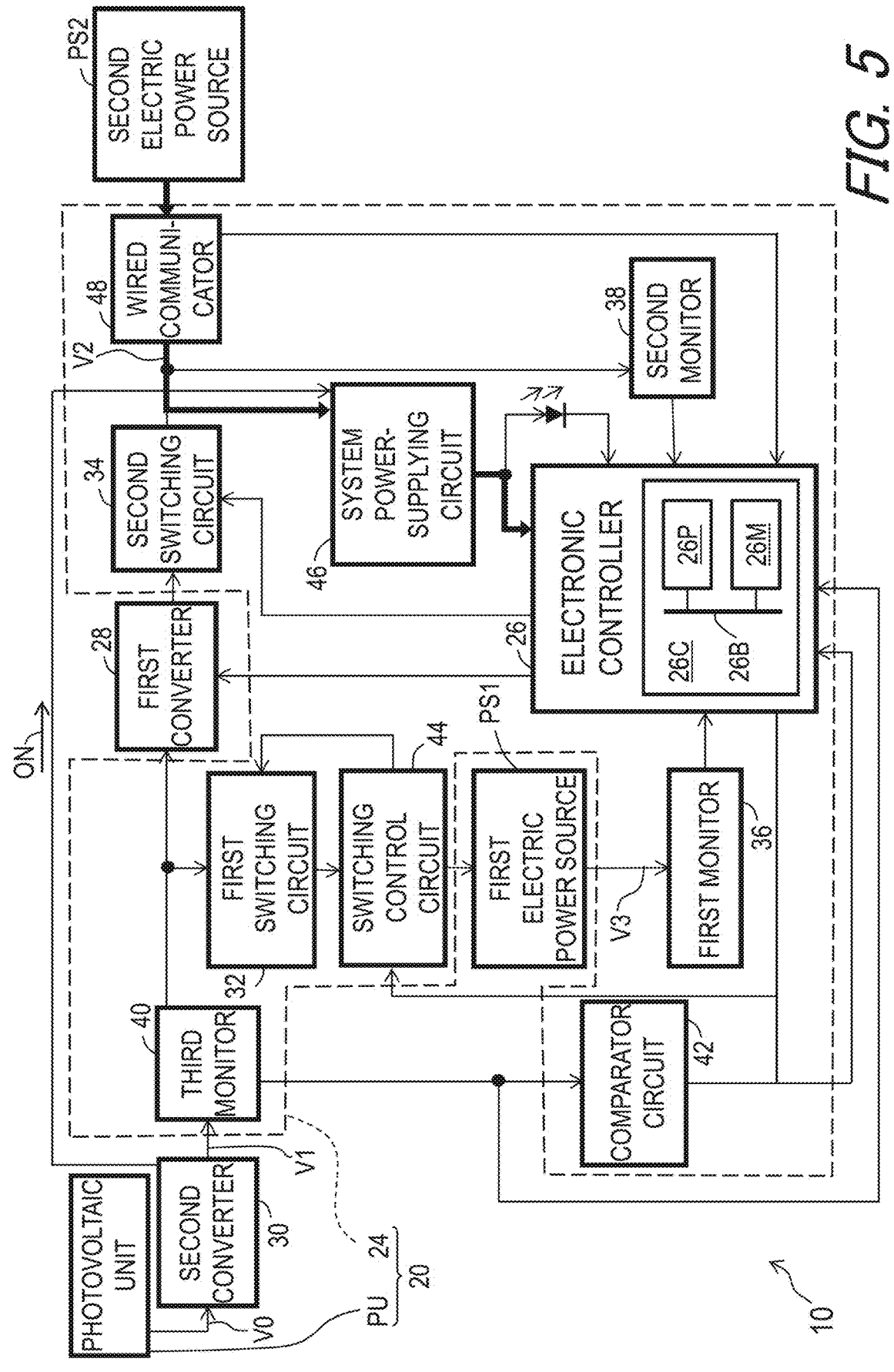
FIG. 5 is a schematic block diagram of the power-supplying system illustrated in FIG. 3 (power-on).

As seen in FIGS. 4 and 5, the power-supplying system 10 is turned off until the second electric power source PS2 is connected to the connection port 49 or the level of electricity supplied from the photovoltaic unit PU is higher than zero. The power-supplying system 10 is turned on in a case where the second electric power source PS2 is connected to the connection port 49 and the level of electricity supplied from the photovoltaic unit PU is higher than zero. The electronic controller circuitry 24 is turned on in the case where the second electric power source PS2 is connected to the connection port 49 and the first voltage V1 is higher than zero.

For example, the second converter 30 transmits an ON command to the system power-supplying circuit 46 in the case where the second converter 30 detects electricity generated by the photovoltaic unit PU. The system power-supplying circuit 46 transmits electricity supplied from the second electric power source PS2 via the connection port 49 and the wired communicator 48 in response to the ON command in a state where the second electric power source PS2 is connected to the connection port 49. The system power-supplying circuit 46 does not transmit electricity regardless of the ON command in a state where the second electric power source PS2 is not connected to the connection port 49. For example, the power-supplying controller 26, the second converter 30, the third monitor 40, the comparator circuit 42, and the switching control circuit 44 are powered by electricity supplied via the system power-supplying circuit 46. The power-supplying system 10 is initialized after the power-supplying controller 26, the second converter 30, the third monitor 40, the comparator circuit 42, and the switching control circuit 44 are powered. For example, initial communication is executed via the wired communicator 48 and the connection port 49 using the PLC.

Figure 7:
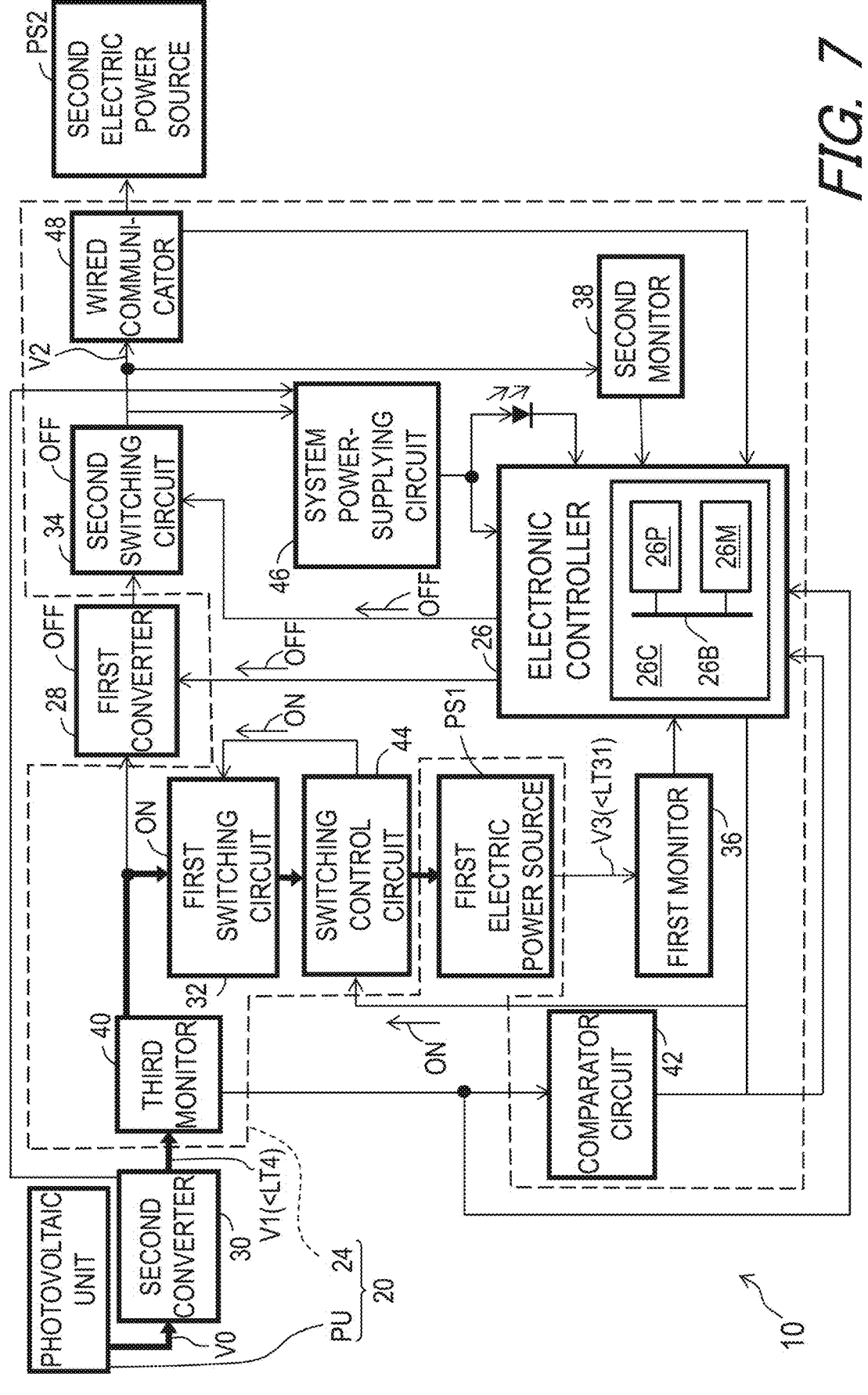
FIG. 7 is a schematic block diagram of the power-supplying system illustrated in FIG. 3 (second state).
Figure 8:
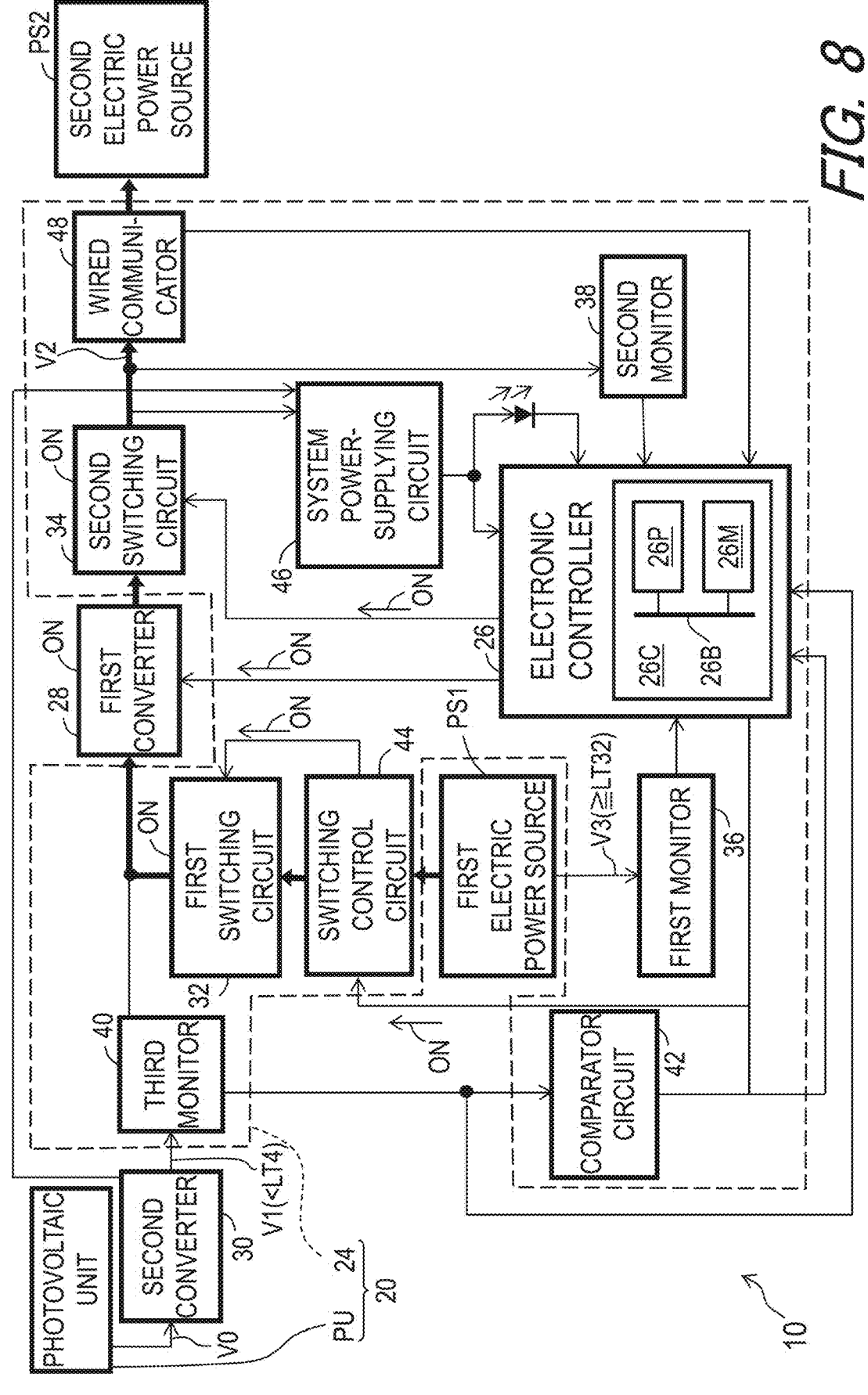
FIG. 8 is a schematic block diagram of the power-supplying system illustrated in FIG. 3 (third state).
Figure 9:
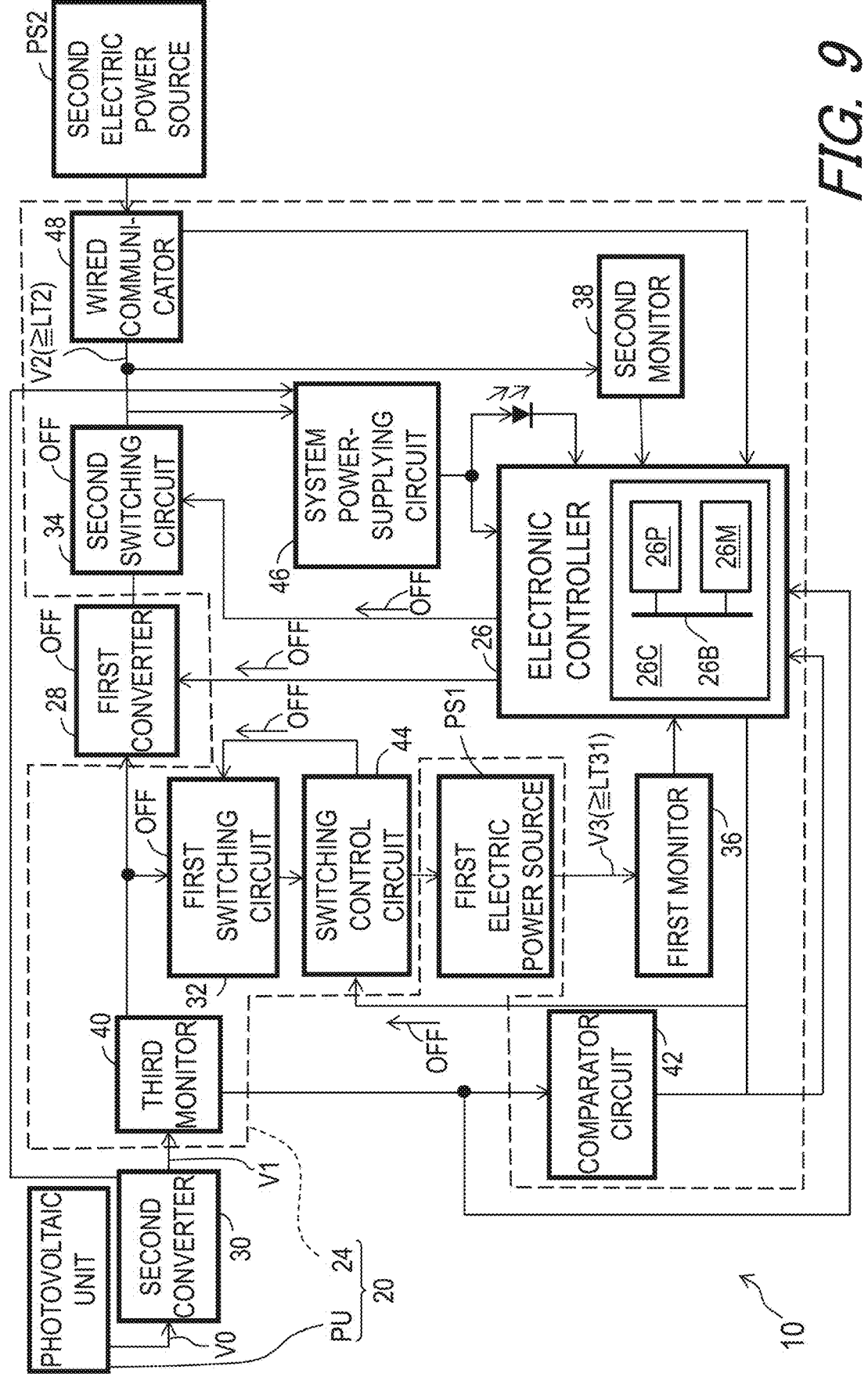
FIG. 9 is a schematic block diagram of the power-supplying system illustrated in FIG. 3 (standby state).

As seen in FIGS. 6 to 9, after the system initialization, the power-supplying system 10 has a first state (FIG. 6), a second state (FIG. 7), a third state (FIG. 8), and a standby state (FIG. 9). In the first state, the second electric power source PS2 is charged using electricity generated by the photovoltaic unit PU. In the second state, the first electric power source PS1 is charged using electricity generated by the photovoltaic unit PU. In the third state, the second electric power source PS2 is charged using electricity stored in the first electric power source PS1 instead of electricity generated by the photovoltaic unit PU. In the standby state, neither charging of the first electric power source PS1 nor charging of the second electric power source PS2 is executed. However, the electronic controller circuitry 24 can have another state other than the first state, the second state, the third state, and the standby state if needed and/or desired.

As seen in FIG. 4, the power-supplying system 10 has a continuously charging mode and an intermittently charging mode. In the continuously charging mode, the second electric power source PS2 is continuously charged using electricity generated by the photovoltaic unit PU. In the intermittently charging mode, the second electric power source PS2 is intermittently charged using electricity stored in the first electric power source PS1. The continuously charging mode includes the first state. The intermittently charging mode includes the second state and the third state. However, the mode of the power-supplying system 10 is not limited to the above modes.

As seen in FIG. 4, the electronic controller circuitry 24 is configured to change a state of the power-supplying system 10 between at least the first state and the second state. The electronic controller circuitry 24 is configured to change the state of the power-supplying system 10 between at least the first state and the second state based on at least one of a state of the photovoltaic unit PU, a state of the first electric power source PS1, and a state of the second electric power source PS2. The electronic controller circuitry 24 is configured to change the state of the power-supplying system 10 between the first state, the second state, and the third state based on at least one of the state of the photovoltaic unit PU, the state of the first electric power source PS1, and the state of the second electric power source PS2. The electronic controller circuitry 24 is configured to change the state of the power-supplying system 10 between the first state, the second state, the third state, and the standby state based on at least one of the state of the photovoltaic unit PU, the state of the first electric power source PS1, and the state of the second electric power source PS2.

Figure 6:
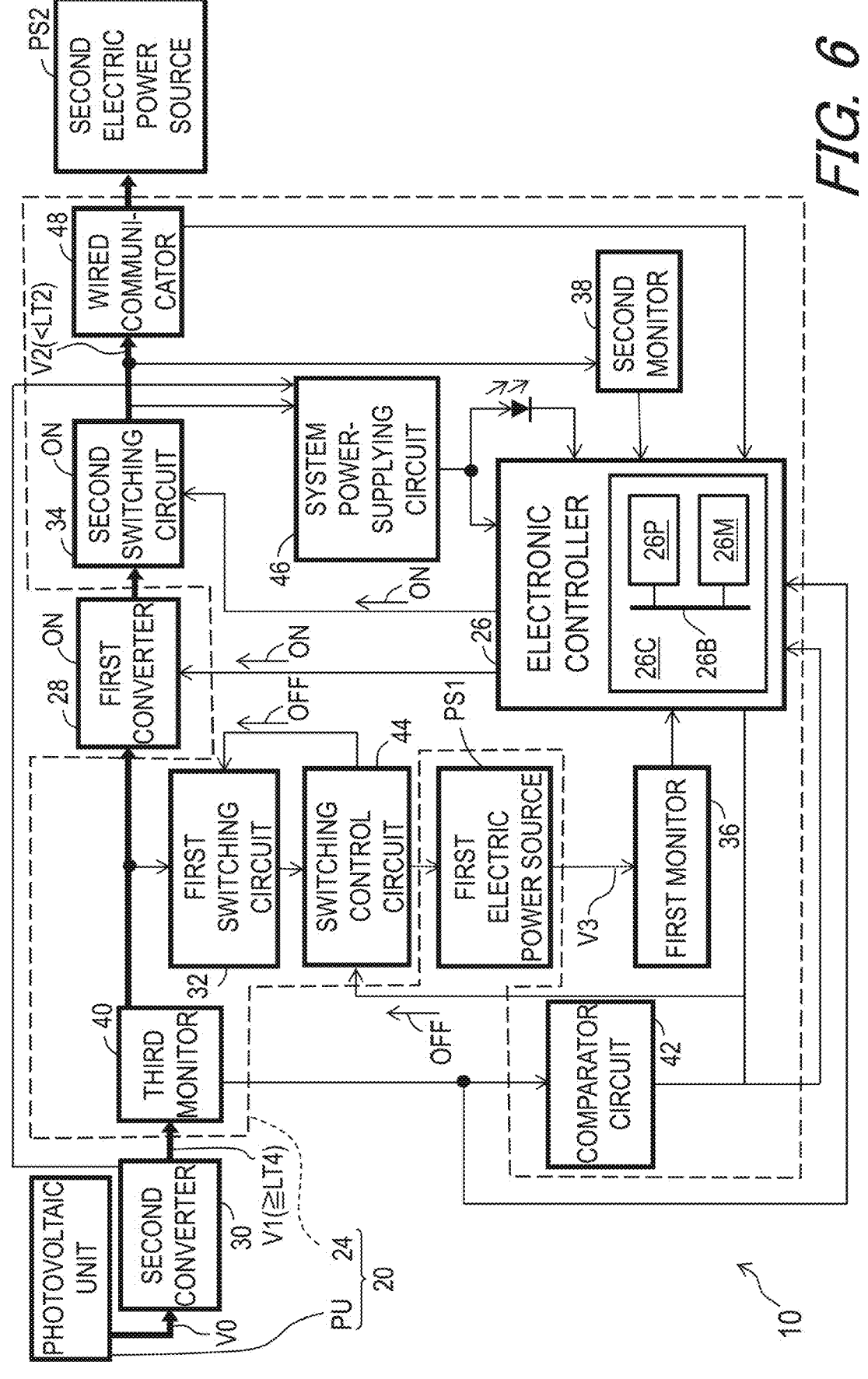
FIG. 6 is a schematic block diagram of the power-supplying system illustrated in FIG. 3 (first state).

As seen in FIGS. 4 and 6, the electronic controller circuitry 24 is configured to charge the second electric power source PS2 in the first state using electricity supplied from the photovoltaic unit PU. The electronic controller circuitry 24 is configured to charge the second electric power source PS2 in the first state using electricity which is supplied from the photovoltaic unit PU without passing through the first electric power source PS1.

The electronic controller circuitry 24 is configured to charge the second electric power source PS2 in the first state using electricity which is supplied from the photovoltaic unit PU via the first converter 28 without passing through the first electric power source PS1. The electronic controller circuitry 24 is configured to charge the second electric power source PS2 in the first state using electricity which is supplied from the photovoltaic unit PU via the first converter 28 and the second converter 30 without passing through the first electric power source PS1.

The electronic controller circuitry 24 is configured to charge the second electric power source PS2 using electricity which is supplied from the photovoltaic unit PU without passing through the first electric power source PS1 in the first state in a case where a level of charge of the second electric power source PS2 is lower than a second level threshold LT2.

The electronic controller circuitry 24 is configured to charge the second electric power source PS2 using electricity which is supplied from the photovoltaic unit PU without passing through the first electric power source PS1 in the first state in a case where the level of charge of the second electric power source PS2 is lower than the second level threshold LT2 and where a level of electricity supplied from the photovoltaic unit PU is higher than an electricity level threshold LT4. The electronic controller circuitry 24 is configured to charge the second electric power source PS2 using electricity which is supplied from the photovoltaic unit PU without passing through the first electric power source PS1 in the first state in a case where the level of charge of the second electric power source PS2 is lower than the second level threshold LT2 and where the level of electricity supplied from the photovoltaic unit PU is higher than or equal to the electricity level threshold LT4.

For example, the level of charge of the second electric power source PS2 includes the second voltage V2 monitored by the second monitor 38, and the level of electricity supplied from the photovoltaic unit PU includes the first voltage V1 monitored by the third monitor 40. However, the level of charge of the second electric power source PS2 can include another factor other than the second voltage V2 if needed and/or desired. The level of electricity supplied from the photovoltaic unit PU can include another factor other than the first voltage V1 if needed and/or desired.

The electronic controller circuitry 24 is configured to charge the second electric power source PS2 using electricity which is supplied from the photovoltaic unit PU without passing through the first electric power source PS1 in a case where the second voltage V2 is lower than the second level threshold LT2 and where the first voltage V1 is higher than the electricity level threshold LT4. The electronic controller circuitry 24 is configured to charge the second electric power source PS2 using electricity which is supplied from the photovoltaic unit PU without passing through the first electric power source PS1 in a case where the second voltage V2 is lower than the second level threshold LT2 and where the first voltage V1 is higher than or equal to the electricity level threshold LT4.

The power-supplying controller 26 transmits the first OFF command to the switching control circuit 44 and the second ON command to the second switching circuit 34 in a case where the second voltage V2 is lower than the second level threshold LT2 and where the first voltage V1 is higher than the electricity level threshold LT4. The power-supplying controller 26 transmits the first OFF command to the switching control circuit 44 and the second ON command to the second switching circuit 34 in a case where the second voltage V2 is lower than the second level threshold LT2 and where the first voltage V1 is higher than or equal to the electricity level threshold LT4. Thus, the electronic controller circuitry 24 enters the first state where the electronic controller circuitry 24 charges the second electric power source PS2 using electricity which is supplied from the photovoltaic unit PU without passing through the first electric power source PS1.

In the present embodiment, for example, the second level threshold LT2 is a voltage at which the second electric power source PS2 is fully charged. However, the second level threshold LT2 can be a voltage lower than the voltage at which the second electric power source PS2 is fully charged if needed and/or desired.

As seen in FIGS. 4 and 7, the electronic controller circuitry 24 is configured to charge the first electric power source PS1 in the second state using electricity supplied from the photovoltaic unit PU. The electronic controller circuitry 24 is configured to charge the first electric power source PS1 in the second state using electricity supplied from the photovoltaic unit PU instead of charging the second electric power source PS2.

The electronic controller circuitry 24 is configured to charge the first electric power source PS1 in the second state using electricity which is supplied from the photovoltaic unit PU without passing through the first converter 28 instead of charging the second electric power source PS2. The electronic controller circuitry 24 is configured to charge the first electric power source PS1 in the second state using electricity which is supplied from the photovoltaic unit PU via the second converter 30 without passing through the first converter 28 instead of charging the second electric power source PS2.

The electronic controller circuitry 24 is configured to charge the first electric power source PS1 using electricity supplied from the photovoltaic unit PU instead of charging the second electric power source PS2 in the second state in a case where the level of electricity supplied from the photovoltaic unit PU is lower than the electricity level threshold LT4.

The electronic controller circuitry 24 is configured to charge the first electric power source PS1 using electricity supplied from the photovoltaic unit PU instead of charging the second electric power source PS2 in the second state in a case where a level of charge of the first electric power source PS1 is lower than a first level threshold LT31 and where the level of electricity supplied from the photovoltaic unit PU is lower than the electricity level threshold LT4.

For example, the level of charge of the first electric power source PS1 includes the output voltage V3 monitored by the first monitor 36, and the level of electricity supplied from the photovoltaic unit PU includes the first voltage V1 monitored by the third monitor 40. However, the level of charge of the first electric power source PS1 can include another factor other than the output voltage V3 of the first electric power source PS1 if needed and/or desired. The level of electricity supplied from the photovoltaic unit PU can include another factor other than the first voltage V1 if needed and/or desired.

The electronic controller circuitry 24 is configured to charge the first electric power source PS1 using electricity supplied from the photovoltaic unit PU instead of charging the second electric power source PS2 in a case where the output voltage V3 is lower than the first level threshold LT31 and where the first voltage V1 is lower than the electricity level threshold LT4.

The comparator circuit 42 transmits the first ON command to the switching control circuit 44 in a case where the first voltage V1 is lower than the electricity level threshold LT4. The power-supplying controller 26 transmits the second OFF command to the second switching circuit 34 in a case where the output voltage V3 is lower than the first level threshold LT31 and where the first voltage V1 is lower than the electricity level threshold LT4. Thus, the electronic controller circuitry 24 enters the second state where the electronic controller circuitry 24 charges the first electric power source PS1 using electricity supplied from the photovoltaic unit PU instead of charging the second electric power source PS2.

In the present embodiment, for example, the first level threshold LT31 is a voltage at which the first electric power source PS1 is fully charged. However, the first level threshold LT31 can be a voltage lower than the voltage at which the first electric power source PS1 is fully charged if needed and/or desired.

As seen in FIG. 4, to protect the first electric power source PS1, the electronic controller circuitry 24 is configured to stop charging the first electric power source PS1 in a case where the electronic controller circuitry 24 recognizes overcharge or charging overcurrent of the first electric power source PS1 in the second state. The electronic controller circuitry 24 is configured to recognize overcharge or charging overcurrent of the first electric power source PS1 in a case where the output voltage V3 monitored by the first monitor 36 exceeds a predetermined threshold in the second state. Charge of the first electric power source PS1 is temporarily prohibited, and only discharge of the first electric power source PS1 is permitted. The electronic controller circuitry 24 is configured to restart charging the first electric power source PS1 in the second state in a case where the electronic controller circuitry 24 neither recognizes overcharge nor charging overcurrent of the first electric power source PS1.

To protect the first electric power source PS1, the electronic controller circuitry 24 is configured to stop charging the second electric power source PS2 in a case where the electronic controller circuitry 24 recognizes over-discharge or discharging overcurrent of the first electric power source PS1 in the third state. The electronic controller circuitry 24 is configured to recognize over-discharge or discharging overcurrent of the first electric power source PS1 in a case where the output voltage V3 monitored by the first monitor 36 exceeds a predetermined threshold in the third state. Discharge of the first electric power source PS1 is temporarily prohibited, and only charge of the first electric power source PS1 is permitted. The electronic controller circuitry 24 is configured to restart charging the second electric power source PS2 using electricity stored in the first electric power source PS1 in the third state in a case where the electronic controller circuitry 24 neither recognizes over-discharge nor discharging overcurrent of the first electric power source PS1.

The electronic controller circuitry 24 is configured to turn off the power-supplying system 10 in a case where the level of electricity supplied from the photovoltaic unit PU is zero in the second state. The electronic controller circuitry 24 is configured to turn off the power-supplying system 10 in a case where the electronic controller circuitry 24 recognizes over-discharge or disconnection of the second electric power source PS2. The electronic controller circuitry 24 is configured to recognize over-discharge of the second electric power source PS2 in a case where the second voltage V2 monitored by the second monitor 38 exceeds a predetermined threshold.

As seen in FIGS. 4 and 8, the electronic controller circuitry 24 is configured to charge the second electric power source PS2 in the third state using electricity supplied from the first electric power source PS1. The electronic controller circuitry 24 is configured to charge the second electric power source PS2 in the third state using electricity supplied from the first electric power source PS1 via the first converter 28. The electronic controller circuitry 24 is configured to charge the second electric power source PS2 in the third state using electricity which is supplied from the first electric power source PS1 via the first converter 28.

The electronic controller circuitry 24 is configured to charge the second electric power source PS2 using electricity supplied from the first electric power source PS1 in the third state in a case where the level of charge of the first electric power source PS1 is higher than a third level threshold LT32 and where the level of electricity supplied from the photovoltaic unit PU is lower than the electricity level threshold LT4.

For example, the level of charge of the first electric power source PS1 includes the output voltage V3 monitored by the first monitor 36, and the level of electricity supplied from the photovoltaic unit PU includes the first voltage V1 monitored by the third monitor 40. However, the level of charge of the first electric power source PS1 can include another factor other than the output voltage V3 of the first electric power source PS1 if needed and/or desired. The level of electricity supplied from the photovoltaic unit PU can include another factor other than the first voltage V1 if needed and/or desired.

The electronic controller circuitry 24 is configured to charge the second electric power source PS2 using electricity supplied from the first electric power source PS1 in a case where the output voltage V3 is higher than the third level threshold LT32 and where the first voltage V1 is lower than the electricity level threshold LT4. The electronic controller circuitry 24 is configured to charge the second electric power source PS2 using electricity supplied from the first electric power source PS1 in a case where the output voltage V3 is higher than or equal to the third level threshold LT32 and where the first voltage V1 is lower than the electricity level threshold LT4.

The comparator circuit 42 transmits the first ON command to the switching control circuit 44 in a case where the first voltage V1 is lower than the electricity level threshold LT4. The power-supplying controller 26 transmits the second OFF command to the second switching circuit 34 in a case where the output voltage V3 monitored by the first monitor 36 is higher than the third level threshold LT32 and where the first voltage V1 is lower than the electricity level threshold LT4. Thus, the electronic controller circuitry 24 enters the third state where the electronic controller circuitry 24 charges the first electric power source PS1 using electricity supplied from the photovoltaic unit PU instead of charging the second electric power source PS2.

In the present embodiment, for example, the third level threshold LT32 is a voltage at which the first electric power source PS1 is fully charged. Namely, the third level threshold LT32 is equal to the first level threshold LT31. However, the third level threshold LT32 can be a voltage lower than the voltage at which the first electric power source PS1 is fully charged if needed and/or desired. The third level threshold LT32 can be different from the first level threshold LT31.

As seen in FIGS. 4 and 9, the electronic controller circuitry 24 is configured to stop charging the second electric power source PS2 using electricity supplied from the photovoltaic unit PU in at least one of a case where the level of charge of the second electric power source PS2 is higher than the second level threshold LT2 and a case where the level of electricity supplied from the photovoltaic unit PU is lower than the electricity level threshold LT4.

In the present embodiment, the electronic controller circuitry 24 is configured to stop charging the second electric power source PS2 using electricity supplied from the photovoltaic unit PU in the case where the level of charge of the second electric power source PS2 is higher than the second level threshold LT2 and where the level of electricity supplied from the photovoltaic unit PU is lower than the electricity level threshold LT4. The electronic controller circuitry 24 is configured to stop charging the second electric power source PS2 using electricity supplied from the photovoltaic unit PU in the case where the level of charge of the second electric power source PS2 is higher than or equal to the second level threshold LT2 and where the level of electricity supplied from the photovoltaic unit PU is lower than the electricity level threshold LT4.

For example, the level of charge of the second electric power source PS2 includes the second voltage V2 monitored by the second monitor 38, and the level of electricity supplied from the photovoltaic unit PU includes the first voltage V1 monitored by the third monitor 40. However, the level of charge of the second electric power source PS2 can include another factor other than the second voltage V2 if needed and/or desired. The level of electricity supplied from the photovoltaic unit PU can include another factor other than the first voltage V1 if needed and/or desired.

The electronic controller circuitry 24 is configured to stop charging the second electric power source PS2 using electricity supplied from the photovoltaic unit PU in the case where the second voltage V2 is higher than the second level threshold LT2 and where the first voltage V1 is lower than the electricity level threshold LT4 in the first state. The electronic controller circuitry 24 is configured to stop charging the second electric power source PS2 using electricity supplied from the photovoltaic unit PU in the case where the second voltage V2 is higher than or equal to the second level threshold LT2 and where the first voltage V1 is lower than the electricity level threshold LT4 in the first state.

The power-supplying controller 26 transmits the second OFF command to the second switching circuit 34 the case where the second voltage V2 is higher than the second level threshold LT2 and where the first voltage V1 is lower than the electricity level threshold LT4 in the first state. Thus, the electronic controller circuitry 24 stops charging the second electric power source PS2, and the electronic controller circuitry 24 changes the state of the electronic controller circuitry 24 from the first state to another state (e.g., the second state or the standby state).

As seen in FIGS. 4 and 9, the electronic controller circuitry 24 is configured to stop charging the first electric power source PS1 using electricity supplied from the photovoltaic unit PU in at least one of a case where the level of charge of the first electric power source PS1 is higher than the first level threshold LT31 and a case where the level of electricity supplied from the photovoltaic unit PU is higher than the electricity level threshold LT4.

In the present embodiment, the electronic controller circuitry 24 is configured to stop charging the first electric power source PS1 using electricity supplied from the photovoltaic unit PU in each of the case where the level of charge of the first electric power source PS1 is higher than the first level threshold LT31 and the case where the level of electricity supplied from the photovoltaic unit PU is higher than the electricity level threshold LT4. The electronic controller circuitry 24 is configured to stop charging the first electric power source PS1 using electricity supplied from the photovoltaic unit PU in each of the case where the level of charge of the first electric power source PS1 is higher than or equal to the first level threshold LT31 and the case where the level of electricity supplied from the photovoltaic unit PU is higher than or equal to the electricity level threshold LT4.

For example, the level of charge of the first electric power source PS1 includes the output voltage V3 monitored by first monitor 36, and the level of electricity supplied from the photovoltaic unit PU includes the first voltage V1 monitored by the third monitor 40. However, the level of charge of the first electric power source PS1 can include another factor other than the output voltage V3 if needed and/or desired. The level of electricity supplied from the photovoltaic unit PU can include another factor other than the first voltage V1 if needed and/or desired.

The electronic controller circuitry 24 is configured to stop charging the first electric power source PS1 using electricity supplied from the photovoltaic unit PU in the case where the output voltage V3 is higher than the first level threshold LT31 in the second state. The electronic controller circuitry 24 is configured to stop charging the first electric power source PS1 using electricity supplied from the photovoltaic unit PU in the case where the output voltage V3 is higher than or equal to the first level threshold LT31 in the second state.

The power-supplying controller 26 transmits the first OFF command to the switching control circuit 44 in the case where the output voltage V3 is higher than the first level threshold LT31 in the second state. The power-supplying controller 26 transmits the first OFF command to the switching control circuit 44 in the case where the output voltage V3 is higher than or equal to the first level threshold LT31 in the second state. Thus, the electronic controller circuitry 24 stops charging the first electric power source PS1, and the electronic controller circuitry 24 changes the state of the electronic controller circuitry 24 from the second state to another state (e.g., the third state or the standby state).

The electronic controller circuitry 24 is configured to stop charging the first electric power source PS1 using electricity supplied from the photovoltaic unit PU in the case where the first voltage V1 is higher than the electricity level threshold LT4 in the second state. The electronic controller circuitry 24 is configured to stop charging the first electric power source PS1 using electricity supplied from the photovoltaic unit PU in the case where the first voltage V1 is higher than or equal to the electricity level threshold LT4 in the second state.

The power-supplying controller 26 transmits the first OFF command to the switching control circuit 44 in the case where the first voltage V1 is higher than the electricity level threshold LT4 in the second state. The power-supplying controller 26 transmits the first OFF command to the switching control circuit 44 in the first voltage V1 is higher than or equal to the electricity level threshold LT4 in the second state. Thus, the electronic controller circuitry 24 stops charging the first electric power source PS1, and the electronic controller circuitry 24 changes the state of the electronic controller circuitry 24 from the second state to another state (e.g., the third state or the standby state).

As seen in FIGS. 4 and 9, the electronic controller circuitry 24 is configured to stop charging the second electric power source PS2 and the first electric power source PS1 in the standby state in a case where the level of charge of the second electric power source PS2 is higher than the second level threshold LT2 and where the level of charge of the first electric power source PS1 is higher than the first level threshold LT31. The electronic controller circuitry 24 is configured to stop charging the second electric power source PS2 and the first electric power source PS1 in the standby state in a case where the level of charge of the second electric power source PS2 is higher than or equal to the second level threshold LT2 and where the level of charge of the first electric power source PS1 is higher than or equal to the first level threshold LT31.

For example, the level of charge of the second electric power source PS2 includes the second voltage V2 monitored by the second monitor 38, and the level of charge of the first electric power source PS1 includes the output voltage V3 monitored by the first monitor 36. However, the level of charge of the second electric power source PS2 can include another factor other than the second voltage V2 if needed and/or desired. The level of charge of the first electric power source PS1 can include another factor other than the output voltage V3 if needed and/or desired.

The electronic controller circuitry 24 is configured to stop charging the second electric power source PS2 and the first electric power source PS1 in a case where the second voltage V2 is higher than the second level threshold LT2 and where the output voltage V3 is higher than the first level threshold LT31. The electronic controller circuitry 24 is configured to stop charging the second electric power source PS2 and the first electric power source PS1 in a case where the second voltage V2 is higher than or equal to the second level threshold LT2 and where the output voltage V3 is higher than or equal to the first level threshold LT31.

The power-supplying controller 26 transmits the second OFF command to the second switching circuit 34 in the case where the second voltage V2 is higher than or equal to the second level threshold LT2 and where the output voltage V3 is higher than or equal to the first level threshold LT31 in the second state in the first state. Thus, the electronic controller circuitry 24 stops charging the second electric power source PS2, and the electronic controller circuitry 24 changes the state of the electronic controller circuitry 24 from the first state to the standby state.

The power-supplying controller 26 transmits the first OFF command to the switching control circuit 44 in the case where the second voltage V2 is higher than or equal to the second level threshold LT2 and where the output voltage V3 is higher than or equal to the first level threshold LT31 in the second state. Thus, the electronic controller circuitry 24 stops charging the first electric power source PS1, and the electronic controller circuitry 24 changes the state of the electronic controller circuitry 24 from the second state to the standby state.

Figure 10:
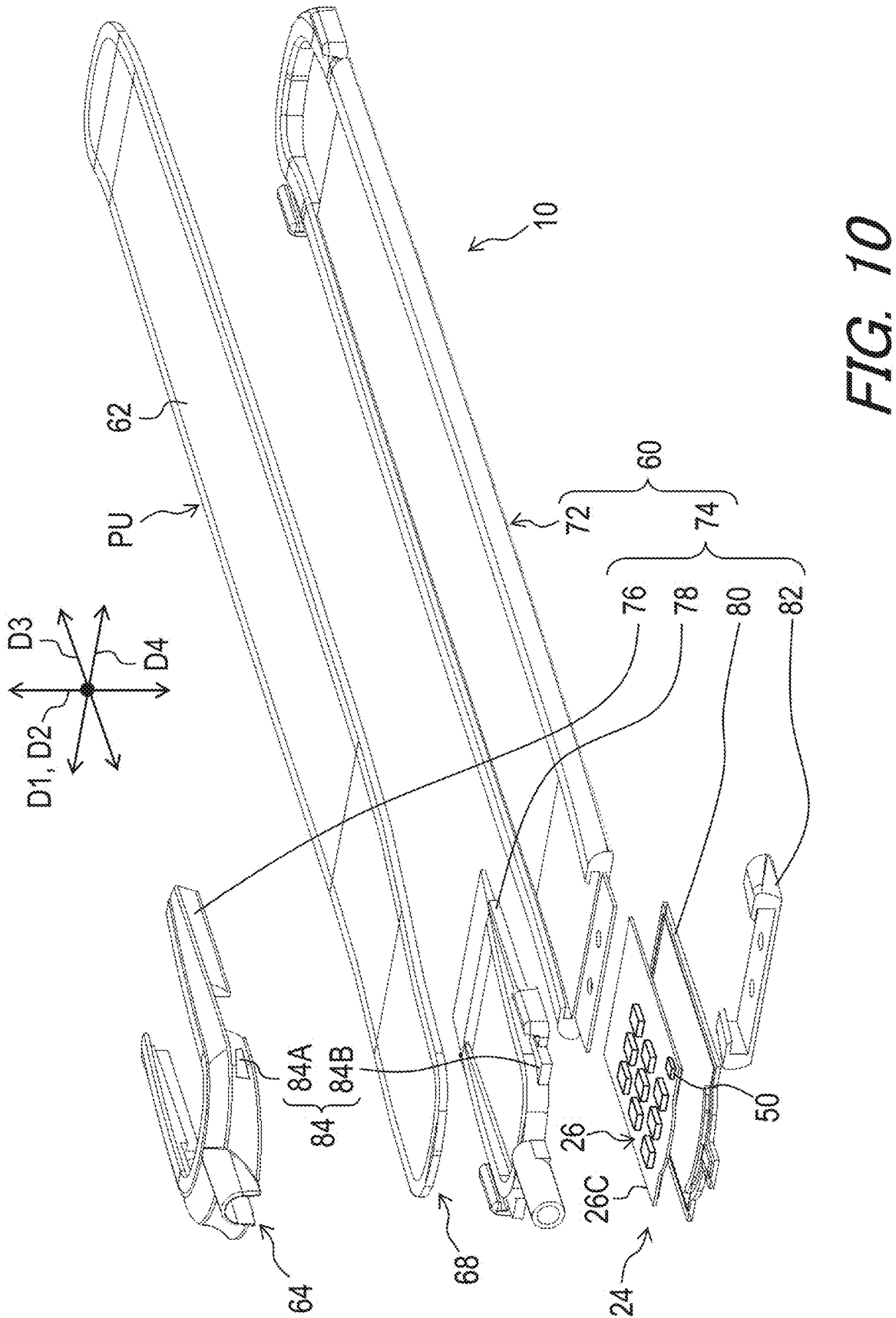
FIG. 10 is an exploded perspective view of the power-supplying system illustrated in FIG. 3.
Figure 11:
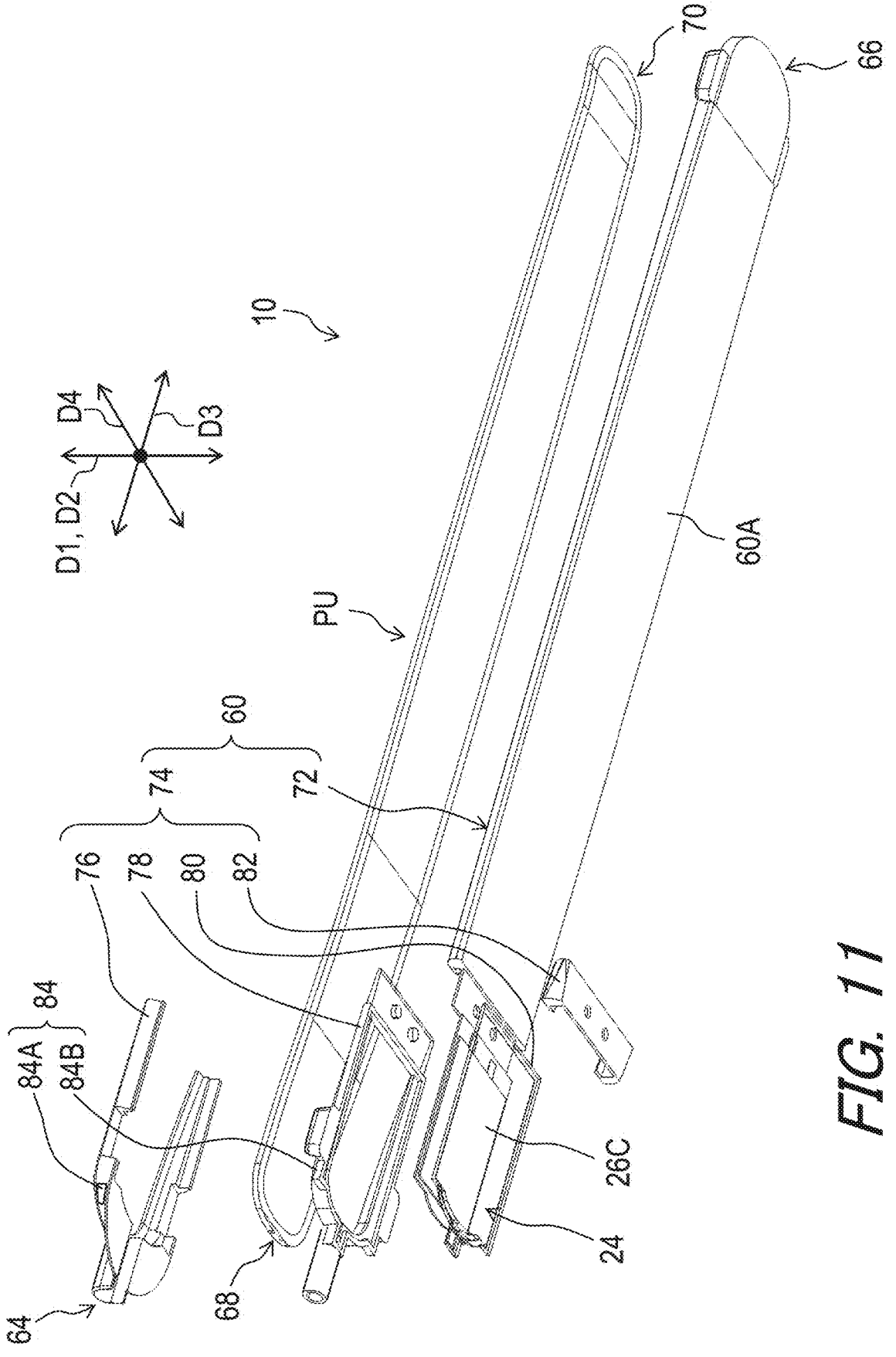
FIG. 11 is another exploded perspective view of the power-supplying system illustrated in FIG. 3.

As seen in FIGS. 10 and 11, the photovoltaic device 20 of the human-powered vehicle 2 comprises a base member 60. The base member 60 is configured to be mounted to the human-powered vehicle 2 (see e.g., FIG. 1). The base member 60 is configured to be mounted to the vehicle body 2A (see e.g., FIG. 1). The vehicle body 2A includes an elongated part 2F (see e.g., FIG. 1). The base member 60 is configured to be arranged along the elongated part 2F of the human-powered vehicle 2 (see e.g., FIG. 1). The base member 60 is configured to be mounted to the elongated part 2F (see e.g., FIG. 1).

As seen in FIG. 1, the base member 60 is provided in a remote position from the electric power source PS2. The base member 60 is separately provided from the electric power source PS2. The base member 60 is a separate member from the electric power source PS2. The base member 60 is secured to the vehicle body 2A with fasteners 62 such as elastic rings. However, the base member 60 can be provided integrally provided with the electric power source PS2 as a single unit if needed and/or desired.

As seen in FIG. 11, the base member 60 includes a mounting surface 60A. The mounting surface 60A is configured to be mounted to the human-powered vehicle 2 (see e.g., FIG. 1). The mounting surface 60A is configured to be mounted to the vehicle body 2A (see e.g., FIG. 1). The mounting surface 60A is contactable with the vehicle body 2A (see e.g., FIG. 1).

As seen in FIG. 10, the photovoltaic unit PU includes a light receiving surface 62. The photovoltaic unit PU is attached to the base member 60. The electronic controller circuitry 24 is attached to the base member 60. The power-supplying controller 26 is attached to the base member 60. The circuit board 26C of the power-supplying controller 26 is attached to the base member 60.

The photovoltaic unit PU and the electronic controller circuitry 24 are provided to the base member 60. The electronic controller circuitry 24 is at least partially provided between the photovoltaic unit PU and the base member 60. In the present embodiment, the electronic controller circuitry 24 is entirely provided between the photovoltaic unit PU and the base member 60. However, the electronic controller circuitry 24 can be partially provided between the photovoltaic unit PU and the base member 60 if needed and/or desired.

Figure 12:
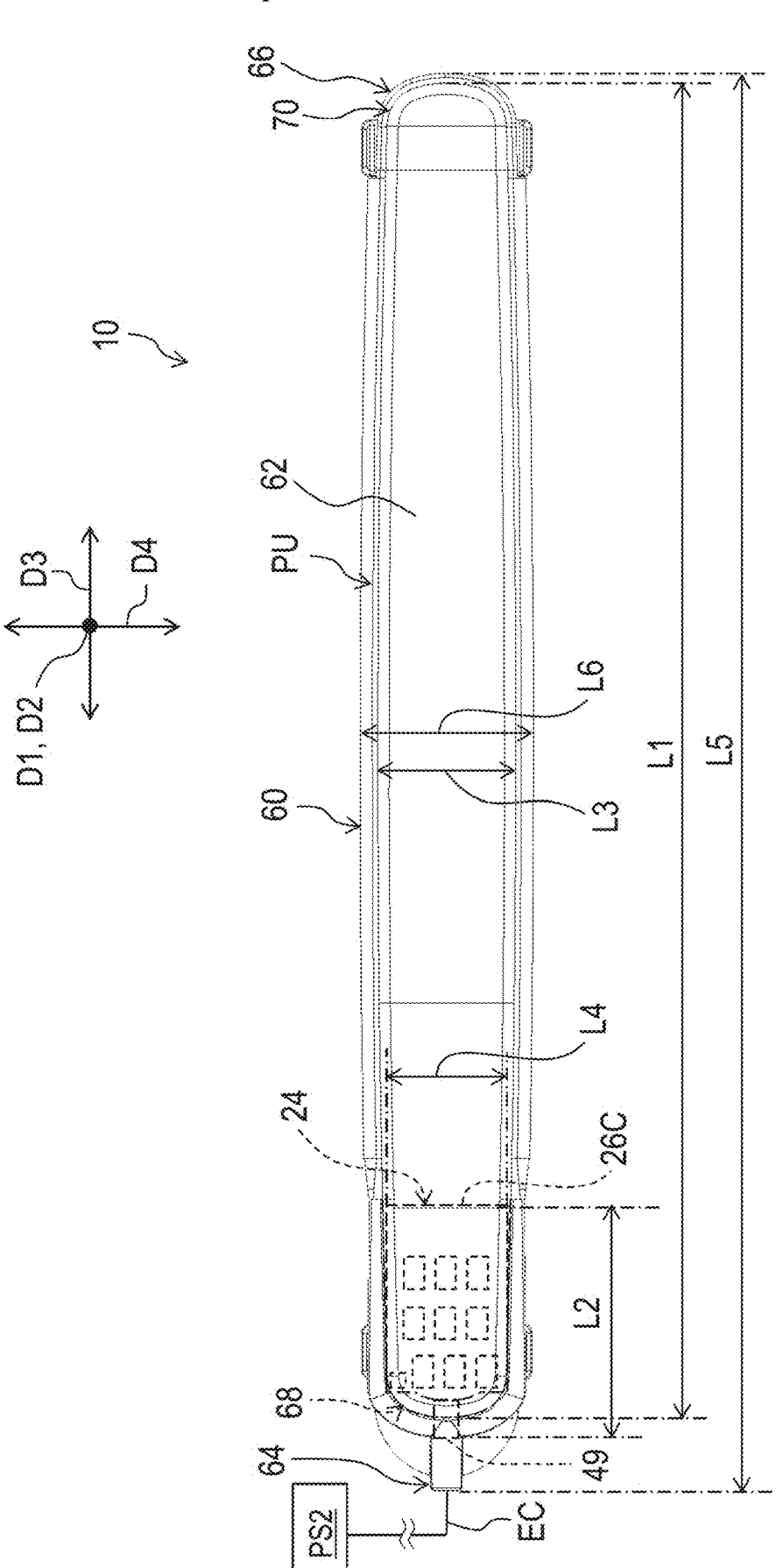
FIG. 12 is a plan view of the power-supplying system illustrated in FIG. 3.

As seen in FIG. 12, the photovoltaic unit PU is arranged to overlap at least partially the electronic controller circuitry 24 as viewed in a perpendicular direction D1 perpendicular to the light receiving surface 62. In the present embodiment, the photovoltaic unit PU is arranged to overlap partially the electronic controller circuitry 24 as viewed in the perpendicular direction D1. However, the photovoltaic unit PU can be arranged to overlap entirely the electronic controller circuitry 24 as viewed in the perpendicular direction D1 if needed and/or desired.

The photovoltaic unit PU is arranged to overlap at least partially the electronic controller circuitry 24 as viewed in a perpendicular direction D2 perpendicular to the mounting surface 60A. In the present embodiment, the photovoltaic unit PU is arranged to overlap partially the electronic controller circuitry 24 as viewed in the perpendicular direction D2. However, the photovoltaic unit PU can be arranged to overlap entirely the electronic controller circuitry 24 as viewed in the perpendicular direction D2 if needed and/or desired.

The light receiving surface 62 is arranged to overlap at least partially the electronic controller circuitry 24 as viewed in the perpendicular direction D1 perpendicular to the light receiving surface 62. The light receiving surface 62 is arranged to overlap partially the electronic controller circuitry 24 as viewed in the perpendicular direction D1. However, the light receiving surface 62 can be arranged to overlap partially the electronic controller circuitry 24 as viewed in the perpendicular direction D1 if needed and/or desired.

The photovoltaic unit PU is arranged to overlap at least partially the circuit board 26C as viewed in the perpendicular direction D1. The photovoltaic unit PU is arranged to overlap at least partially the indicator 50 as viewed in the perpendicular direction D1. The circuit board 26C is arranged to overlap at least partially the indicator 50 as viewed in the perpendicular direction D1. In the present embodiment, the photovoltaic unit PU is arranged to overlap partially the circuit board 26C as viewed in the perpendicular direction D1. The photovoltaic unit PU is arranged to overlap partially the indicator 50 as viewed in the perpendicular direction D1. The circuit board 26C is arranged to overlap partially the indicator 50 as viewed in the perpendicular direction D1. However, the photovoltaic unit PU can be arranged to overlap entirely the circuit board 26C as viewed in the perpendicular direction D1 if needed and/or desired. The photovoltaic unit PU is arranged to overlap entirely the indicator 50 as viewed in the perpendicular direction D1 if needed and/or desired. The circuit board 26C is arranged to overlap entirely the indicator 50 as viewed in the perpendicular direction D1 if needed and/or desired.

As seen in FIG. 12, the base member 60 includes a first base end 64 and a second base end 66. The base member 60 extends between the first base end 64 and the second base end 66 in a longitudinal direction D3. The photovoltaic unit PU has a first length L1 defined in the longitudinal direction D3. The electronic controller circuitry 24 has a second length L2 defined in the longitudinal direction D3. The connection port 49 is provided in the base member 60. For example, the connection port 49 includes port terminals connectable with cable terminals of the electrical cable. The second length L2 is defined by the circuit board 26C and the port terminals of the connection port 49 in the longitudinal direction D3. In the present embodiment, the first length L1 is longer than the second length L2. However, the first length L1 can be shorter than or equal to the second length L2 if needed and/or desired. The second length L2 can be defined by parts other than the circuit board 26C and the connection port 49 if needed and/or desired.

The photovoltaic unit PU has a third length L3 defined in a width direction D4 perpendicular to the longitudinal direction D3. The electronic controller circuitry 24 has a fourth length L4 defined in the width direction D4. In the present embodiment, the first length L1 is longer than the third length L3. The third length L3 is longer than the fourth length L4. However, the first length L1 can be shorter than or equal to the third length L3 if needed and/or desired. The third length L3 can be longer than or equal to the fourth length L4 if needed and/or desired.

The photovoltaic unit PU includes a first end portion 68 and a second end portion 70 and extends between the first end portion 68 and the second end portion 70 in the longitudinal direction D3. The first length L1 is defined by the first end portion 68 and the second end portion 70 in the longitudinal direction D3. The first end portion 68 is provided to the first base end 64. The second end portion 70 is provided to the second base end 66. In the present embodiment, the electronic controller circuitry 24 is provided to the first base end 64. However, the electronic controller circuitry 24 can be provided to parts other than the first base end 64 if needed and/or desired. The base member 60 can have any shapes other than an elongated shape if needed and/or desired. The photovoltaic unit PU can have any shapes other than an elongated shape if needed and/or desired.

The base member 60 includes a first base length L5 and a second base length L6. The first base length L5 is defined in the longitudinal direction D3. The first base length L5 is defined by the first base end 64 and the second base end 66 in the longitudinal direction D3. The second base length L6 is defined in the width direction D4. In the present embodiment, the first base length L5 is longer than each of the first length L1, the second length L2, the third length L3, and the second base length L6. The second base length L6 is longer than each of the third length L3 and the fourth length L4. However, the first base length L5 can be shorter than or equal to at least one of the first length L1, the second length L2, the third length L3, and the second base length L6 if needed and/or desired. The second base length L6 can be shorter than or equal to at least one of the third length L3 and the fourth length L4 if needed and/or desired.

As seen in FIGS. 10 and 11, the base member 60 is at least partially made of an elastic material. The base member 60 includes a first base body 72 and a second base body 74. The first base body 72 is made of the elastic material. The second base body 74 is made of a material having rigidity higher than rigidity of the elastic material. The first base body 72 has flexibility higher than the second base body 74.

In the present embodiment, the base member 60 is partially made of the elastic material. The first base body 72 is made of elastomer such as rubber. The second base body 74 is made of the material (e.g., synthetic resin such as plastic) having rigidity higher than rigidity of the elastomer. However, the first base body 72 can be made of materials other than synthetic resin if needed and/or desired. The second base body 74 can be made of materials other than elastomer if needed and/or desired.

The photovoltaic unit PU has rigidity which is lower than or equal to the rigidity of the base member 60. The organic photovoltaic unit PU2 has rigidity which is lower than or equal to the rigidity of the base member 60. The rigidity of the organic photovoltaic unit PU2 is lower than rigidity of the second base body 74. The rigidity of the organic photovoltaic unit PU2 is lower than or equal to the rigidity of the first base body 72.

The photovoltaic unit PU has flexibility which is higher than or equal to the flexibility of the base member 60. The organic photovoltaic unit PU2 has flexibility which is higher than or equal to the flexibility of the base member 60. The flexibility of the organic photovoltaic unit PU2 is higher than flexibility of the second base body 74. The flexibility of the organic photovoltaic unit PU2 is higher than or equal to the flexibility of the first base body 72. The photovoltaic unit PU is bendable.

The photovoltaic unit PU is at least partially provided to the first base body 72. The electronic controller circuitry 24 is at least partially provided to the second base body 74. In the present embodiment, the photovoltaic unit PU is partially provided to the first base body 72. The electronic controller circuitry 24 is partially provided to the second base body 74. However, the electronic controller circuitry 24 can be entirely provided to only one of the first base body 72 and the second base body 74 if needed and/or desired.

The second base body 74 includes a first frame 76, a second frame 78, a third frame 80, and a fourth frame 82. The photovoltaic unit PU is at least partially provided between the first frame 76 and the second frame 78. The circuit board 26C is at least partially provided between the second frame 78 and the third frame 80. The fourth frame 82 couples the first base body 72, the first frame 76, the second frame 78, and the third frame 80.

The second base body 74 includes a light transmission part 84. The light transmission part 84 is configured to transmit light emitted from the indicator 50. The light transmission part 84 includes a first light transmission part 84A and a second light transmission part 84B. The first light transmission part 84A is provided to the first frame 76. The second light transmission part 84B is provided to the second frame 78. The first light transmission part 84A is made of a material having light transparency. The second light transmission part 84B is made of a material having light transparency. The light transmission part 84 can be provided to portions other than the second base body 74 if needed and/or desired. The first light transmission part 84A can be provided to portions other than the first frame 76 if needed and/or desired. The second light transmission part 84B can be provided to portions other than the second frame 78 if needed and/or desired.

In the present embodiment, the light receiving surface 62 is at least partially parallel to the mounting surface 60A. Thus, the perpendicular direction D1 is parallel to the perpendicular direction D2. However, the perpendicular direction D1 can be nonparallel to the perpendicular direction D2 if needed and/or desired. The light receiving surface 62 can be entirely non-parallel to the mounting surface 60A if needed and/or desired. The perpendicular direction D1 can also be referred to as a first direction D1. The perpendicular direction D2 can also be referred to as a second direction D2.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A power-supplying system of a human-powered vehicle, comprising:

a first electric power source electrically connectable with a photovoltaic unit to store electricity supplied from the photovoltaic unit; and electronic controller circuitry electrically connectable with the photovoltaic unit and a second electric power source, the electronic controller circuitry being configured to charge the second electric power source in a first state using electricity which is supplied from the photovoltaic unit without passing through the first electric power source, the electronic controller circuitry being configured to charge the first electric power source in a second state using electricity supplied from the photovoltaic unit instead of charging the second electric power source.

2. A power-supplying system of a human-powered vehicle, comprising:

a first electric power source electrically connectable with a photovoltaic unit to store electricity supplied from the photovoltaic unit; and electronic controller circuitry electrically connectable with the photovoltaic unit and a second electric power source, the electronic controller circuitry being configured to charge the second electric power source in a first state using electricity supplied from the photovoltaic unit, the electronic controller circuitry being configured to charge the first electric power source in a second state using electricity supplied from the photovoltaic unit, the electronic controller circuitry being configured to change a state of the power-supplying system between at least the first state and the second state.

3. A power-supplying system of a human-powered vehicle, comprising:

a first electric power source electrically connectable with a photovoltaic unit to store electricity supplied from the photovoltaic unit; and electronic controller circuitry electrically connectable with the photovoltaic unit and a second electric power source to charge the second electric power source using electricity supplied from the photovoltaic unit, the electronic controller circuitry being configured to be powered by an electric power source other than the first electric power source.

4. The power-supplying system according to claim 3, wherein the electronic controller circuitry is configured to charge the second electric power source in a first state using electricity which is supplied from the photovoltaic unit without passing through the first electric power source, and the electronic controller circuitry is configured to charge the first electric power source in a second state using electricity supplied from the photovoltaic unit instead of charging the second electric power source.

5. The power-supplying system according to claim 1, wherein the electronic controller circuitry is configured to charge the second electric power source in a third state using electricity supplied from the first electric power source.

6. The power-supplying system according to claim 1, further comprising a first converter, wherein the first electric power source is configured to store electricity supplied from the photovoltaic unit at a first voltage, and the first converter is electrically connectable with the photovoltaic unit to convert the first voltage to a second voltage.

7. The power-supplying system according to claim 6, wherein the electronic controller circuitry is configured to charge the second electric power source in the first state using electricity which is supplied from the photovoltaic unit via the first converter without passing through the first electric power source.

8. The power-supplying system according to claim 6, wherein the electronic controller circuitry is configured to charge the first electric power source in the second state using electricity which is supplied from the photovoltaic unit without passing through the first converter instead of charging the second electric power source.

9. The power-supplying system according to claim 6, wherein
the electronic controller circuitry is configured to charge the second electric power source in a third state using electricity supplied from the first electric power source via the first converter.

10. The power-supplying system according to claim 6, further comprising
a second converter electrically connectable with the photovoltaic unit to convert an initial voltage supplied from the photovoltaic unit to the first voltage.

11. The power-supplying system according to claim 10, wherein
the electronic controller circuitry is configured to charge the second electric power source in the first state using electricity which is supplied from the photovoltaic unit via the first converter and the second converter without passing through the first electric power source.

12. The power-supplying system according to claim 10, wherein
the electronic controller circuitry is configured to charge the first electric power source in the second state using electricity which is supplied from the photovoltaic unit via the second converter without passing through the first converter instead of charging the second electric power source.

13. The power-supplying system according to claim 10, wherein
the electronic controller circuitry is configured to charge the second electric power source in a third state using electricity which is supplied from the first electric power source via the first converter.

14. The power-supplying system according to claim 1, wherein
the electronic controller circuitry is configured to charge the second electric power source using electricity which is supplied from the photovoltaic unit without passing through the first electric power source in the first state in a case where a level of charge of the second electric power source is lower than a second level threshold.

15. The power-supplying system according to claim 14, wherein
the electronic controller circuitry is configured to charge the second electric power source using electricity which is supplied from the photovoltaic unit without passing through the first electric power source in the first state in a case where the level of charge of the second electric power source is lower than the second level threshold and where a level of electricity supplied from the photovoltaic unit is higher than an electricity level threshold.

16. The power-supplying system according to claim 15, wherein
the electronic controller circuitry is configured to stop charging the second electric power source using electricity supplied from the photovoltaic unit in at least one of a case where the level of charge of the second electric power source is higher than the second level threshold and a case where the level of electricity supplied from the photovoltaic unit is lower than the electricity level threshold.

17. The power-supplying system according to claim 1, wherein the electronic controller circuitry is configured to charge the first electric power source using electricity supplied from the photovoltaic unit instead of charging the second electric power source in the second state in a case where a level of electricity supplied from the photovoltaic unit is lower than an electricity level threshold.

18. The power-supplying system according to claim 17, wherein
the electronic controller circuitry is configured to charge the first electric power source using electricity supplied from the photovoltaic unit instead of charging the second electric power source in the second state in a case where a level of charge of the first electric power source is lower than a first level threshold and where the level of electricity supplied from the photovoltaic unit is lower than the electricity level threshold.

19. The power-supplying system according to claim 18, wherein
the electronic controller circuitry is configured to stop charging the first electric power source using electricity supplied from the photovoltaic unit in at least one of a case where the level of charge of the first electric power source is higher than the first level threshold and a case where the level of electricity supplied from the photovoltaic unit is higher than the electricity level threshold.

20. The power-supplying system according to claim 1, wherein
the electronic controller circuitry is configured to charge the second electric power source using electricity supplied from the first electric power source in a third state in a case where a level of charge of the first electric power source is higher than a third level threshold and where a level of electricity supplied from the photovoltaic unit is lower than an electricity level threshold.

21. The power-supplying system according to claim 1, wherein
the electronic controller circuitry is configured to stop charging the second electric power source and the first electric power source in a standby state in a case where a level of charge of the second electric power source is higher than a second level threshold and where a level of charge of the first electric power source is higher than a first level threshold.

22. The power-supplying system according to claim 1, wherein
the electronic controller circuitry is configured not to be directly powered by the first electric power source.

23. The power-supplying system according to claim 1, further comprising
the photovoltaic unit configured to convert energy of light to electricity.

24. The power-supplying system according to claim 23, wherein
the photovoltaic unit includes a solar cell array electrically connected to the first electric power source and the electronic controller circuitry.

25. The power-supplying system according to claim 1, wherein
the electronic controller circuitry is configured to be powered by the second electric power source.

* * * * *